(12) United States Patent
Averbeck et al.

(10) Patent No.: US 9,637,397 B2
(45) Date of Patent: May 2, 2017

(54) ION REMOVAL USING A CAPACITIVE DEIONIZATION SYSTEM

(75) Inventors: David J. Averbeck, Dousman, WI (US); Rebecca M. Tallon, Hartland, WI (US); Brett A. Boedeker, Glendale, WI (US)

(73) Assignee: Pentair Residential Filtration, LLC, Glendale, WI (US)

( * ) Notice: Subject to any disclaimer, the term of this patent is extended or adjusted under 35 U.S.C. 154(b) by 1463 days.

(21) Appl. No.: 13/283,265

(22) Filed: Oct. 27, 2011

(65) Prior Publication Data

US 2013/0105323 A1 May 2, 2013

(51) Int. Cl.
 *C02F 1/46* (2006.01)
 *C02F 1/00* (2006.01)
 (Continued)

(52) U.S. Cl.
 CPC ............ *C02F 1/008* (2013.01); *C02F 1/4691* (2013.01); *C02F 1/281* (2013.01); *C02F 1/283* (2013.01); *C02F 1/32* (2013.01); *C02F 2201/4611* (2013.01); *C02F 2201/46125* (2013.01); *C02F 2201/46135* (2013.01); *C02F 2201/46145* (2013.01); *C02F 2209/001* (2013.01);
 (Continued)

(58) Field of Classification Search
 CPC .... C02F 1/008; C02F 1/4691; C02F 2209/03; C02F 1/281; C02F 1/32; C02F 1/283; C02F 2209/003; C02F 2209/40; C02F 2209/005; C02F 2201/46125; C02F 2209/001; C02F 2201/46145; C02F 2201/4611; C02F 2201/46135; C02F 2209/05
 See application file for complete search history.

(56) References Cited

U.S. PATENT DOCUMENTS 1,022,523 A  4/1912  Whitney
1,117,185 A  11/1914 Griffin
(Continued)

FOREIGN PATENT DOCUMENTS

CN    1192938 C    3/2005
CN    101014542    8/2007
(Continued)

OTHER PUBLICATIONS

International Search Report and Written Opinion of the International Searching Authority issued in PCT Application No. PCT/US2012/062433; date of mailing Jan. 8, 2013.
(Continued)

*Primary Examiner* — Arun S Phasge
(74) *Attorney, Agent, or Firm* — Quarles & Brady LLP

(57) ABSTRACT

Embodiments of the invention provide methods of removing ions from a feed water stream using a flow-through capacitor and a controller for performing the methods. A target value for a water property concentration or a fixed percent removal of a water property concentration to be removed is established for a treated water stream exiting the flow-through capacitor. A feed value for the water property concentration is measured in a feed water stream entering the flow-through capacitor. An amperage of the flow-through capacitor and a flow rate through the flow-through capacitor is controlled to remove ions from the feed water stream to achieve the desired removal of the water property.

32 Claims, 8 Drawing Sheets

(51) Int. Cl.
*C02F 1/469* (2006.01)
*C02F 1/28* (2006.01)
*C02F 1/32* (2006.01)

(52) U.S. Cl.
CPC .. *C02F 2209/003* (2013.01); *C02F 2209/005* (2013.01); *C02F 2209/03* (2013.01); *C02F 2209/05* (2013.01); *C02F 2209/40* (2013.01)

(56) References Cited

U.S. PATENT DOCUMENTS

| | | |
|---|---|---|
| 1,131,859 A | 3/1915 | Parks |
| 1,769,192 A | 7/1930 | Smith |
| 2,788,319 A | 4/1957 | Pearson |
| 2,891,900 A | 6/1959 | Kollsman |
| 2,923,674 A | 2/1960 | Kressman |
| 2,981,671 A | 4/1961 | Griffiths |
| 3,149,062 A | 9/1964 | Gottschal et al. |
| 3,216,920 A | 11/1965 | Nellen |
| 3,223,606 A | 12/1965 | Chen |
| 3,251,763 A | 5/1966 | Carey |
| 3,287,251 A | 11/1966 | Horne et al. |
| 3,341,441 A | 9/1967 | Giuffrida et al. |
| 3,398,091 A | 8/1968 | Greatorex |
| 3,411,630 A | 11/1968 | Alwall et al. |
| 3,544,436 A | 12/1970 | Francis et al. |
| 3,585,122 A | 6/1971 | King |
| 3,630,378 A | 12/1971 | Bauman |
| 3,669,267 A | 6/1972 | Hutton |
| 3,755,134 A | 8/1973 | Francis et al. |
| 3,838,774 A | 10/1974 | Dolan et al. |
| 3,878,086 A | 4/1975 | Haswell et al. |
| 3,933,617 A | 1/1976 | Yamamoto et al. |
| 3,985,636 A | 10/1976 | Schneider |
| 4,102,752 A | 7/1978 | Rugh, II |
| 4,115,274 A | 9/1978 | Boddeker et al. |
| 4,187,086 A | 2/1980 | Walmet et al. |
| 4,228,014 A | 10/1980 | Timm et al. |
| 4,233,371 A | 11/1980 | Dorrestijn |
| 4,255,012 A | 3/1981 | Parent et al. |
| 4,274,939 A | 6/1981 | Bjaareklint |
| 4,319,978 A | 3/1982 | Millman |
| 4,334,992 A | 6/1982 | von Bonin et al. |
| 4,345,009 A | 8/1982 | Fahle et al. |
| 4,427,549 A | 1/1984 | Brown et al. |
| 4,465,573 A | 8/1984 | O'Hare |
| 4,519,913 A | 5/1985 | Baldwin et al. |
| 4,539,091 A | 9/1985 | Kaneda et al. |
| 4,569,747 A | 2/1986 | Kedem et al. |
| 4,622,123 A | 11/1986 | Nejame, Jr. |
| 4,622,133 A | 11/1986 | Furuno |
| 4,632,745 A | 12/1986 | Giuffrida et al. |
| 4,655,909 A | 4/1987 | Furuno |
| 4,666,603 A | 5/1987 | Madsen et al. |
| 4,698,154 A | 10/1987 | Mohn et al. |
| 4,715,939 A | 12/1987 | Ball et al. |
| 4,728,585 A | 3/1988 | Briggs |
| 4,747,929 A | 5/1988 | Siu et al. |
| 4,752,373 A | 6/1988 | Korngold |
| 4,755,305 A | 7/1988 | Fremont et al. |
| 4,804,451 A | 2/1989 | Palmer |
| 4,808,287 A | 2/1989 | Hark |
| 4,849,073 A | 7/1989 | Dotson et al. |
| 4,871,431 A | 10/1989 | Parsi |
| 4,925,541 A | 5/1990 | Giuffrida et al. |
| 4,931,160 A | 6/1990 | Giuffrida |
| 5,006,216 A | 4/1991 | Dietrich et al. |
| 5,026,465 A | 6/1991 | Katz et al. |
| 5,066,375 A | 11/1991 | Parsi et al. |
| 5,073,255 A | 12/1991 | Chili et al. |
| 5,089,140 A | 2/1992 | Brane et al. |
| 5,094,732 A | 3/1992 | Oldani et al. |
| 5,120,416 A | 6/1992 | Parsi et al. |
| 5,132,094 A | 7/1992 | Godec et al. |
| 5,154,809 A | 10/1992 | Oren et al. |
| 5,164,080 A | 11/1992 | Furuno |
| 5,185,048 A | 2/1993 | Guerif |
| 5,192,432 A | 3/1993 | Andelman |
| 5,196,115 A | 3/1993 | Andelman |
| 5,200,046 A | 4/1993 | Chlanda et al. |
| 5,203,976 A | 4/1993 | Parsi et al. |
| 5,292,422 A | 3/1994 | Liang et al. |
| 5,308,466 A | 5/1994 | Ganzi et al. |
| 5,316,637 A | 5/1994 | Ganzi et al. |
| 5,360,540 A | 11/1994 | Andelman |
| 5,425,858 A | 6/1995 | Farmer |
| 5,431,788 A | 7/1995 | Jones |
| 5,443,991 A | 8/1995 | Godec et al. |
| 5,460,723 A | 10/1995 | Bourbigot et al. |
| 5,503,735 A | 4/1996 | Vinas et al. |
| 5,527,450 A | 6/1996 | Burrows |
| 5,538,611 A | 7/1996 | Otowa |
| 5,538,746 A | 7/1996 | Levy |
| 5,558,753 A | 9/1996 | Gallagher et al. |
| 5,565,072 A | 10/1996 | Faita et al. |
| 5,620,597 A | 4/1997 | Andelman |
| 5,637,204 A | 6/1997 | Botte |
| 5,681,438 A | 10/1997 | Proulx |
| 5,716,503 A | 2/1998 | Dean et al. |
| 5,718,828 A | 2/1998 | Jangbarwala et al. |
| 5,736,023 A | 4/1998 | Gallagher et al. |
| 5,756,874 A | 5/1998 | Steward |
| 5,762,774 A | 6/1998 | Tessier |
| 5,776,340 A | 7/1998 | Jangbarwala et al. |
| 5,779,911 A | 7/1998 | Haug et al. |
| 5,788,826 A | 8/1998 | Nyberg |
| 5,837,110 A | 11/1998 | Dean |
| 5,837,124 A | 11/1998 | Su et al. |
| 5,891,328 A | 4/1999 | Goldstein |
| 5,925,230 A | 7/1999 | Fajt et al. |
| 5,925,240 A | 7/1999 | Wilkins et al. |
| 5,943,204 A | 8/1999 | Jones et al. |
| 5,954,937 A | 9/1999 | Farmer |
| 5,961,805 A | 10/1999 | Terada et al. |
| 5,980,718 A | 11/1999 | Van Konynenburg et al. |
| 6,017,433 A | 1/2000 | Mani |
| 6,040,072 A | 3/2000 | Murphy et al. |
| 6,056,878 A | 5/2000 | Tessier et al. |
| 6,096,179 A | 8/2000 | Fajt et al. |
| 6,117,297 A | 9/2000 | Goldstein |
| 6,123,823 A | 9/2000 | Mani |
| 6,126,805 A | 10/2000 | Batchelder et al. |
| RE36,972 E | 11/2000 | Baker et al. |
| 6,149,788 A | 11/2000 | Tessier et al. |
| 6,156,180 A | 12/2000 | Tessier et al. |
| 6,187,162 B1 | 2/2001 | Mir |
| 6,190,553 B1 | 2/2001 | Lee |
| 6,193,869 B1 | 2/2001 | Towe et al. |
| 6,214,214 B1 | 4/2001 | Hansen et al. |
| 6,235,166 B1 | 5/2001 | Towe et al. |
| 6,241,893 B1 | 6/2001 | Levy |
| 6,258,265 B1 | 7/2001 | Jones |
| 6,274,018 B1 | 8/2001 | Hidaka |
| 6,296,751 B1 | 10/2001 | Mir |
| 6,303,037 B1 | 10/2001 | Tamura et al. |
| 6,309,532 B1 | 10/2001 | Tran et al. |
| 6,344,122 B1 | 2/2002 | Deguchi et al. |
| 6,346,187 B1 | 2/2002 | Tran et al. |
| 6,365,023 B1 | 4/2002 | De Los Reyes et al. |
| 6,379,518 B1 | 4/2002 | Osawa et al. |
| 6,391,178 B1 | 5/2002 | Garcia et al. |
| 6,391,188 B1 | 5/2002 | Goosey |
| 6,402,920 B1 | 6/2002 | Sato et al. |
| 6,413,409 B1 | 7/2002 | Otowa et al. |
| 6,436,264 B1 | 8/2002 | Tamura |
| 6,444,127 B1 | 9/2002 | Vaughan et al. |
| 6,461,512 B1 | 10/2002 | Hirayama et al. |
| 6,461,756 B1 | 10/2002 | Blanchet et al. |
| 6,462,935 B1 | 10/2002 | Shiue et al. |
| 6,482,304 B1 | 11/2002 | Emery et al. |
| 6,490,777 B1 | 12/2002 | Proulx et al. |
| 6,508,937 B1 | 1/2003 | Kawashima et al. |
| 6,565,725 B2 | 5/2003 | Sugaya et al. |
| 6,569,298 B2 | 5/2003 | Merida-Donis |

(56) References Cited

U.S. PATENT DOCUMENTS

| | | |
|---|---|---|
| 6,580,598 B2 | 6/2003 | Shiue et al. |
| 6,607,647 B2 | 8/2003 | Wilkins et al. |
| 6,607,668 B2 | 8/2003 | Rela |
| 6,625,863 B2 | 9/2003 | Proulx et al. |
| 6,628,505 B1 | 9/2003 | Andelman |
| 6,645,383 B1 | 11/2003 | Lee et al. |
| 6,649,037 B2 | 11/2003 | Arba et al. |
| 6,657,546 B2 | 12/2003 | Navarro et al. |
| 6,661,643 B2 | 12/2003 | Shiue et al. |
| 6,709,560 B2 | 3/2004 | Andelman et al. |
| 6,726,822 B2 | 4/2004 | Garcia et al. |
| 6,745,903 B2 | 6/2004 | Grandics |
| 6,758,954 B2 | 7/2004 | Liang et al. |
| 6,761,809 B2 | 7/2004 | Tran et al. |
| 6,761,823 B2 | 7/2004 | Maddux et al. |
| 6,764,787 B2 | 7/2004 | Grasso et al. |
| 6,783,666 B2 | 8/2004 | Takeda et al. |
| 6,793,801 B2 | 9/2004 | Holland |
| 6,795,298 B2 | 9/2004 | Shiue et al. |
| 6,830,595 B2 | 12/2004 | Reynolds, III |
| 6,835,486 B2 | 12/2004 | Prediger et al. |
| 6,866,757 B2 | 3/2005 | Gilmore |
| 6,896,814 B2 | 5/2005 | Chidambaran et al. |
| 6,908,546 B2 | 6/2005 | Smith |
| 6,926,878 B2 | 8/2005 | Santina |
| 6,929,748 B2 | 8/2005 | Avijit et al. |
| 6,929,765 B2 | 8/2005 | Cotton et al. |
| 6,998,044 B2 | 2/2006 | Jangbarwala |
| 7,018,522 B2 | 3/2006 | Holland |
| 7,026,364 B2 | 4/2006 | Inoue et al. |
| 7,033,472 B2 | 4/2006 | Yamanaka et al. |
| 7,037,618 B2 | 5/2006 | Andrews et al. |
| 7,083,733 B2 | 8/2006 | Freydina et al. |
| 7,094,325 B2 | 8/2006 | Mack et al. |
| 7,097,752 B2 | 8/2006 | Li et al. |
| 7,101,468 B1 | 9/2006 | Botte |
| 7,138,042 B2 | 11/2006 | Tran et al. |
| 7,138,045 B2 | 11/2006 | Sferrazza |
| 7,144,735 B2 | 12/2006 | Saini |
| 7,147,785 B2 | 12/2006 | Arba et al. |
| 7,201,832 B2 | 4/2007 | Yamanaka et al. |
| 7,206,189 B2 | 4/2007 | Reynolds, III |
| 7,214,301 B2 | 5/2007 | Thorstensen |
| 7,247,225 B2 | 7/2007 | Miwa et al. |
| 7,252,752 B2 | 8/2007 | Holland |
| 7,261,802 B2 | 8/2007 | Xu et al. |
| 7,264,737 B2 | 9/2007 | Godec et al. |
| 7,306,709 B2 | 12/2007 | Grebenyuk et al. |
| 7,326,325 B2 | 2/2008 | Liang et al. |
| 7,329,358 B2 * | 2/2008 | Wilkins .................. B01D 61/48 210/748.11 |
| 7,338,595 B2 | 3/2008 | VanNewenhizen et al. |
| 7,338,600 B2 | 3/2008 | Chidambaran et al. |
| 7,393,445 B2 | 7/2008 | Inoue et al. |
| 7,407,585 B2 | 8/2008 | Gaignet |
| 7,425,583 B2 | 9/2008 | Inoue et al. |
| 7,449,093 B2 | 11/2008 | Dudziak et al. |
| 7,470,366 B2 | 12/2008 | Queen et al. |
| 7,481,929 B2 | 1/2009 | Wilkins et al. |
| 7,485,213 B2 | 2/2009 | Miwa et al. |
| 7,501,064 B2 | 3/2009 | Schmidt et al. |
| 7,563,351 B2 | 7/2009 | Wilkins et al. |
| 7,572,359 B2 | 8/2009 | Liang et al. |
| 7,578,416 B2 | 8/2009 | Underwood |
| 7,582,198 B2 | 9/2009 | Wilkins et al. |
| 7,582,216 B2 | 9/2009 | Arnott et al. |
| 7,604,725 B2 | 10/2009 | Ganzi et al. |
| 7,632,406 B2 | 12/2009 | Wilson et al. |
| 7,658,828 B2 | 2/2010 | Freydina et al. |
| 7,662,266 B2 | 2/2010 | Heydecke et al. |
| 7,666,288 B2 | 2/2010 | Sato |
| 7,686,950 B2 | 3/2010 | Gaignet |
| 7,704,361 B2 | 4/2010 | Garde et al. |
| 7,761,981 B2 | 7/2010 | Rosenthal et al. |
| 7,763,157 B2 | 7/2010 | Bejtlich, III, et al. |
| 7,766,981 B2 | 8/2010 | Bourcier et al. |
| 7,767,097 B1 | 8/2010 | Campbell |
| 7,820,024 B2 | 10/2010 | Freydina |
| 7,846,340 B2 | 12/2010 | Freydina et al. |
| 7,862,700 B2 | 1/2011 | Wilkins et al. |
| 8,097,130 B2 | 1/2012 | Cline et al. |
| 2002/0144954 A1 | 10/2002 | Arba et al. |
| 2002/0182472 A1 | 12/2002 | Molter et al. |
| 2003/0038089 A1 | 2/2003 | Levy |
| 2003/0041908 A1 | 3/2003 | Scanlan et al. |
| 2003/0079993 A1 | 5/2003 | Miwa et al. |
| 2003/0089609 A1 | 5/2003 | Liang et al. |
| 2003/0098266 A1 | 5/2003 | Shiue et al. |
| 2004/0013918 A1 | 1/2004 | Merida-Donis |
| 2004/0060819 A1 | 4/2004 | Pizzamiglio et al. |
| 2004/0060823 A1 | 4/2004 | Carson et al. |
| 2004/0104166 A1 | 6/2004 | Tessier et al. |
| 2004/0118780 A1 | 6/2004 | Willman et al. |
| 2004/0173535 A1 | 9/2004 | Li |
| 2005/0103622 A1 | 5/2005 | Jha et al. |
| 2005/0103631 A1 | 5/2005 | Freydina et al. |
| 2005/0103717 A1 | 5/2005 | Jha et al. |
| 2005/0103722 A1 | 5/2005 | Freydina et al. |
| 2005/0109703 A1 | 5/2005 | VanNewenhizen |
| 2005/0263457 A1 | 12/2005 | Wilkins et al. |
| 2006/0096899 A1 | 5/2006 | Lillback |
| 2006/0144789 A1 | 7/2006 | Cath et al. |
| 2006/0157422 A1 | 7/2006 | Freydina et al. |
| 2006/0231403 A1 | 10/2006 | Riviello |
| 2006/0231406 A1 | 10/2006 | Freydina et al. |
| 2006/0243604 A1 | 11/2006 | Nakagawa et al. |
| 2006/0254919 A1 | 11/2006 | Jangbarwala |
| 2007/0034573 A1 | 2/2007 | Jangbarwala |
| 2007/0051684 A1 | 3/2007 | Grebenyuk et al. |
| 2007/0108056 A1 | 5/2007 | Nyberg et al. |
| 2007/0209942 A1 | 9/2007 | Shyu |
| 2007/0272550 A1 | 11/2007 | Shiue et al. |
| 2007/0278099 A1 | 12/2007 | Barber |
| 2008/0023333 A1 | 1/2008 | Johnson |
| 2008/0023400 A1 | 1/2008 | Kloos et al. |
| 2008/0029395 A1 | 2/2008 | Fan |
| 2008/0035548 A1 | 2/2008 | Fan |
| 2008/0057398 A1 | 3/2008 | Wei et al. |
| 2008/0073215 A1 | 3/2008 | Barber et al. |
| 2008/0073288 A1 | 3/2008 | Fan et al. |
| 2008/0078672 A1 | 4/2008 | Atlas |
| 2008/0093225 A1 | 4/2008 | Cline et al. |
| 2008/0093282 A1 | 4/2008 | Ukon |
| 2008/0105548 A1 | 5/2008 | Liang et al. |
| 2008/0116136 A1 | 5/2008 | Wilkins et al. |
| 2008/0128349 A1 | 6/2008 | Chen |
| 2008/0144256 A1 | 6/2008 | Cai et al. |
| 2008/0185294 A1 | 8/2008 | Cai et al. |
| 2008/0185346 A1 | 8/2008 | Xiong et al. |
| 2008/0198531 A1 | 8/2008 | Shiue et al. |
| 2008/0230376 A1 | 9/2008 | Brauns |
| 2008/0290546 A1 | 11/2008 | Andelman et al. |
| 2009/0035631 A1 | 2/2009 | Zagaja et al. |
| 2009/0045048 A1 | 2/2009 | Bourcier et al. |
| 2009/0045074 A1 | 2/2009 | Hoover et al. |
| 2009/0127119 A1 * | 5/2009 | Witte ..................... C02F 1/008 204/662 |
| 2009/0134029 A1 | 5/2009 | Tanahashi et al. |
| 2009/0139932 A1 | 6/2009 | Haas et al. |
| 2009/0152117 A1 | 6/2009 | Akahori et al. |
| 2009/0194478 A1 | 8/2009 | Saveliev et al. |
| 2009/0218227 A1 | 9/2009 | Noh et al. |
| 2009/0223825 A1 | 9/2009 | Lee et al. |
| 2009/0255815 A1 | 10/2009 | Shiue et al. |
| 2010/0006438 A1 | 1/2010 | Antich et al. |
| 2010/0012503 A1 | 1/2010 | Hinatsu et al. |
| 2010/0025247 A1 | 2/2010 | Daily, III |
| 2010/0059378 A1 | 3/2010 | Elson et al. |
| 2010/0059382 A1 | 3/2010 | Sun et al. |
| 2010/0065439 A1 | 3/2010 | Sullivan |
| 2010/0065511 A1 | 3/2010 | Knapp et al. |
| 2010/0078327 A1 | 4/2010 | Noh et al. |
| 2010/0096269 A1 | 4/2010 | Kaku et al. |
| 2010/0108521 A1 | 5/2010 | Riviello |

(56) References Cited

U.S. PATENT DOCUMENTS

| | | |
|---|---|---|
| 2010/0126937 A1 | 5/2010 | Felch |
| 2010/0140095 A1 | 6/2010 | Telepciak et al. |
| 2010/0213051 A1 | 8/2010 | Ishikawa et al. |
| 2010/0230277 A1 | 9/2010 | Sullivan et al. |
| 2010/0296999 A1 | 11/2010 | Campbell |
| 2010/0297000 A1 | 11/2010 | Campbell |
| 2010/0326833 A1 | 12/2010 | Messalem et al. |
| 2011/0000789 A1 | 1/2011 | Grabowski |
| 2011/0005933 A1 | 1/2011 | Kawaguchi et al. |
| 2011/0005934 A1 | 1/2011 | Barber et al. |
| 2011/0017666 A1 | 1/2011 | Cath et al. |
| 2011/0042219 A1 | 2/2011 | Wei et al. |
| 2011/0073191 A1 | 3/2011 | Gray, Jr. |
| 2012/0217170 A1* | 8/2012 | Van Der Wal ........ C02F 1/4691 205/743 |

FOREIGN PATENT DOCUMENTS

| | | |
|---|---|---|
| CN | 101084328 A | 12/2007 |
| CN | 1898416 B | 10/2010 |
| CN | 1863737 B | 4/2011 |
| CN | 101291880 B | 9/2011 |
| CN | 101878187 B | 12/2014 |
| EP | 1343923 | 2/2005 |
| EP | 1343923 B1 | 2/2005 |
| EP | 1939143 A4 | 5/2011 |
| EP | 2322486 | 5/2011 |
| GB | 2383275 | 6/2003 |
| JP | 53088671 | 8/1978 |
| JP | 2006088004 | 4/2006 |
| KR | 20030038621 | 5/2003 |
| KR | 20040103625 | 12/2004 |
| WO | 2005118484 A1 | 12/2005 |
| WO | 2006050079 A3 | 10/2006 |
| WO | WO2007/044609 | 4/2007 |
| WO | 2011056070 A1 | 5/2011 |

OTHER PUBLICATIONS

European Search Report issued in EP Application No. EP12843307; mailed May 21, 2015.
Translation of Notification of the First Office action in CN Application No. CN21280060769.1; mailed Jun. 19, 2015.
European Search Report issued in related EP Application No. EP12844027; mailed Sep. 7, 2015.
Translation of Notification of the First Office Action in related CN Application No. CN201280060766.8; mailed May 21, 2015.
Translation of Notification of the Second Office Action in related CN Application No. CN201280060766.8; mailed Jan. 20, 2016.
Translation of Notification of the Second Office Action in CN Application No. CN201280060769.1; mailed Feb. 26, 2016.
European Search Report issued in related EP Application No. EP12843075; mailed Jul. 23, 2015.
Translation of Notification of the First Office Action in related CN Application No. CN201280060771.9; mailed Aug. 25, 2015.
Translation of Notification of the Second Office action in related CN application No. CN201280060771.9; mailed Apr. 8, 2016.
Translation of Notification of the Third Office action in related CN application No. CN201280060766.8; mailed Jun. 12, 2016.

* cited by examiner

ION REMOVAL USING A CAPACITIVE DEIONIZATION SYSTEM

BACKGROUND

This application is directed at systems, devices, and methods for the treatment of water using electrochemical treatment.

Capacitive deionization can be used to remove electrically-charged constituents, such as ions, from water. In capacitive deionization systems, a stream of water passes through one or more flow-through capacitors which include pairs of polarized electrodes. To treat the stream as the water passes between the electrodes, a voltage potential is established between the electrodes. This voltage potential causes constituents in the water to be attracted to and at least temporarily retained on one of the electrodes while the comparatively purified water is allowed to exit the capacitor.

After some time of treatment, the electrodes will become saturated with constituents such that the electrodes can no longer effectively remove constituents from the stream of water. To regenerate the capacity of the flow-through capacitor, the flow-through capacitor may be set to discharge the captured constituents. Typically, this discharge occurs by removing the voltage potential or by temporarily applying a voltage potential in an opposite direction to the voltage potential established during treatment, thereby releasing the constituents from the electrodes. During discharge, the effluent water carrying the constituents is typically routed to a waste line.

SUMMARY

Some embodiments of the invention provide a method of removing ions from a feed water stream using a flow-through capacitor having at least a pair of electrodes spaced from one another to accommodate a flow of water and configured to transfer ions between the pair of electrodes and the water. A target value for a water property concentration is established for a treated water stream exiting the flow-through capacitor. A feed value for the water property concentration is measured in a feed water stream entering the flow-through capacitor. An amount of the water property concentration to be removed from the feed water stream is calculated based on the feed value to achieve the target value for the water property concentration in the treated water stream. An amperage of the flow-through capacitor and a flow rate through the flow-through capacitor is controlled to remove ions from the feed water stream to achieve the target value for the water property concentration in the treated water stream.

Some embodiments of the invention provide a method of removing ions from a feed water stream using a flow-through capacitor having at least a pair of electrodes spaced from one another to accommodate a flow of water and configured to transfer ions between the pair of electrodes and the water. A fixed percent removal of a water property concentration to be removed from the feed water stream passing through the flow-through capacitor is established. A feed value for the water property concentration in a feed water stream entering the flow-through capacitor is measured. An amperage of the flow-through capacitor and a flow rate through the flow-through capacitor is controlled to remove ions from the feed water stream to achieve the fixed percent removal of the water property concentration from the feed water stream.

Some embodiments of the invention provide a controller for performing one or both of methods described above.

DETAILED DESCRIPTION

Figure 1:
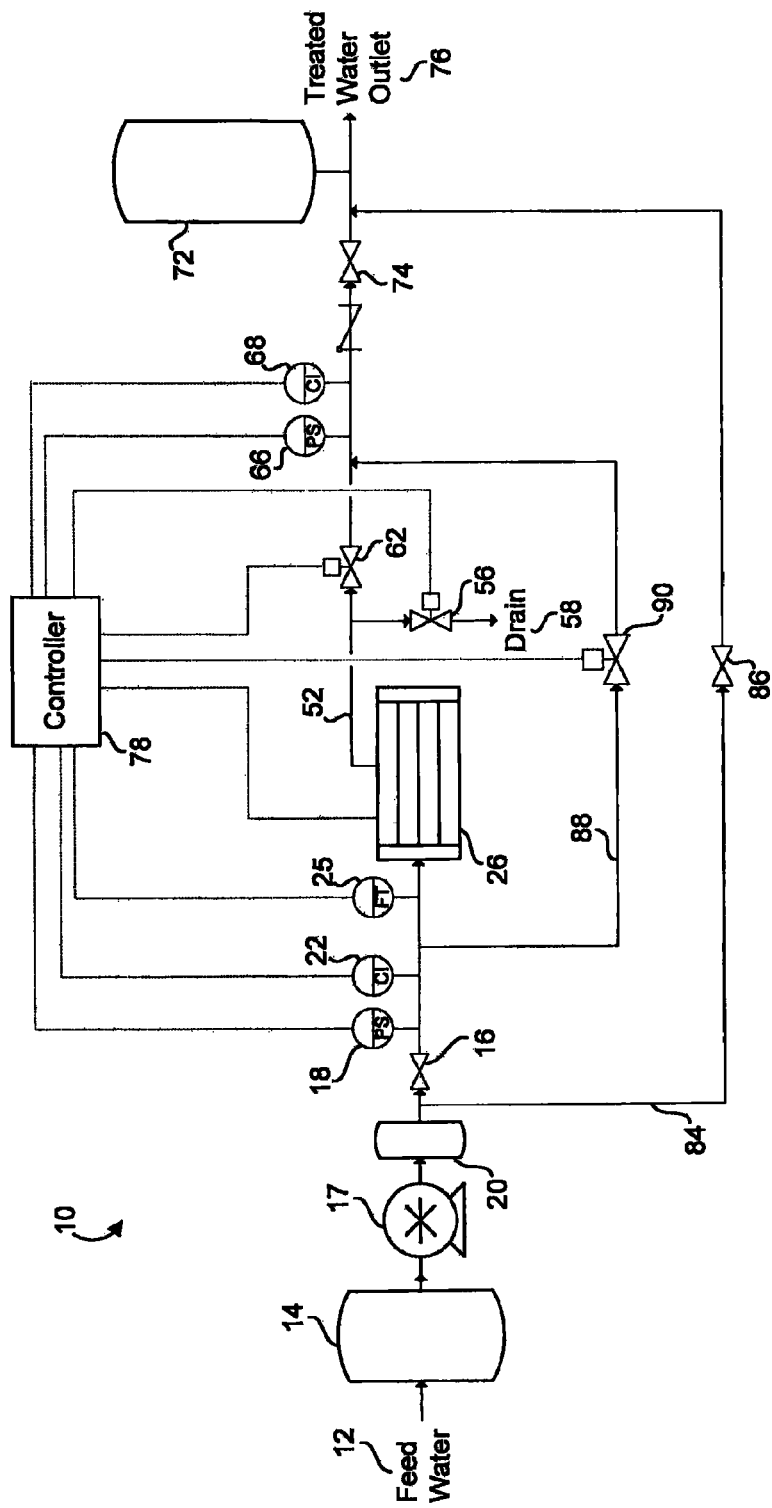
FIG. 1 is a schematic of a capacitive deionization system having a flow-through capacitor and a hydropneumatic storage tank according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
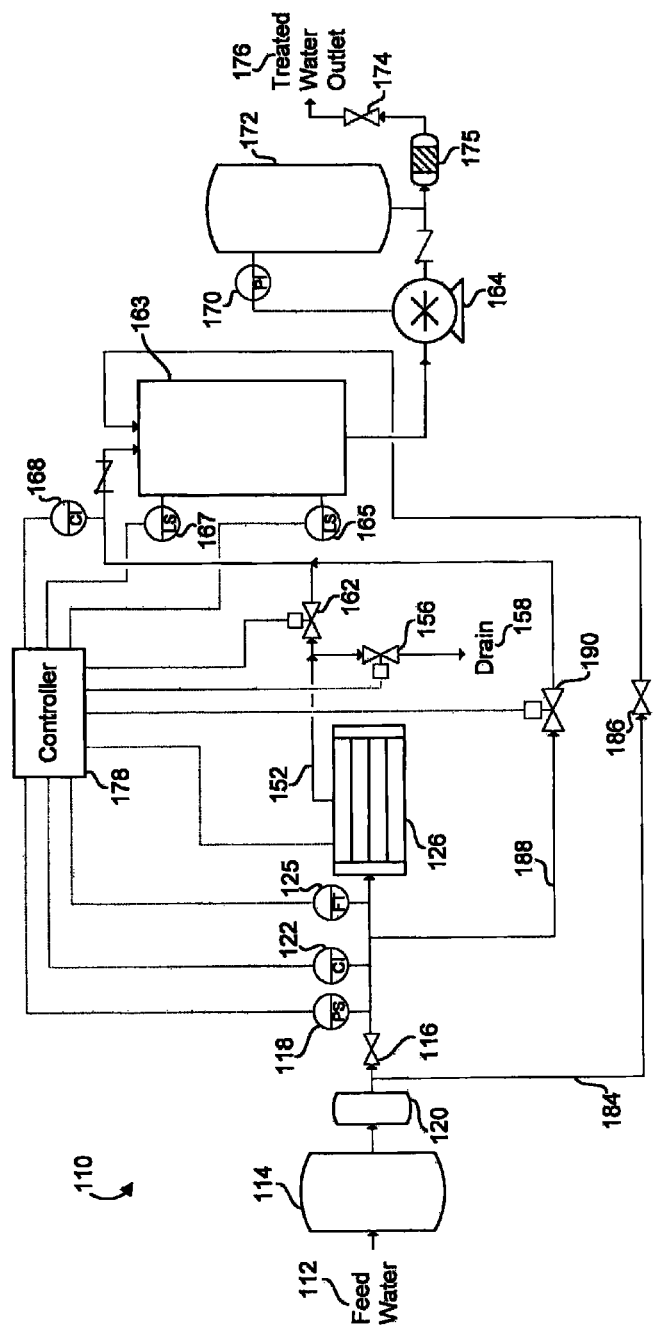
FIG. 2 is a schematic of a capacitive deionization system having a flow-through capacitor and an atmospheric tank according to another embodiment of the invention.

FIGS. 1 and 2 illustrate capacitive deionization systems 10, 110 without and with an atmospheric tank 163, respectfully. These capacitive deionization systems 10, 110 are designed to receive feed water and treat this water using capacitive deionization along with other optional treatment processes to remove constituents from the water. Systems of this type can be used, for example, to treat water to improve water quality for a particular use or to re-claim valuable constituents (e.g., metals) from the water stream. Accordingly, while a system for water treatment is described, the systems and methods described herein can be applied to any application in which a flow-through capacitor may be used.

Figure 4:
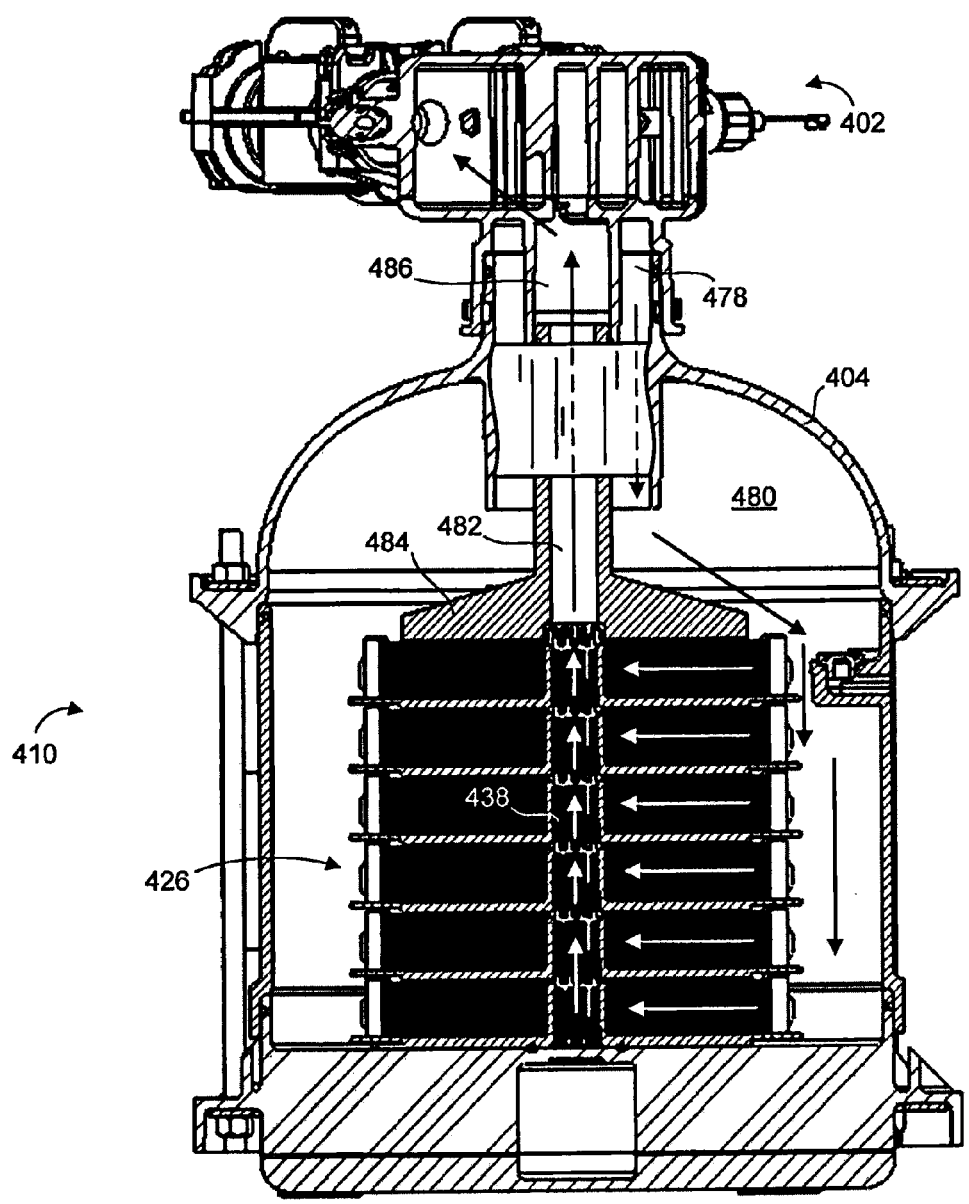
FIG. 4 is a partial cross-sectional side view of a vessel containing a flow-through capacitor in which the vessel has a valve attached thereto that is configured to selectively route water through the flow-through capacitor and the valve performs the various functions provided by some of the multiple separate valves from FIGS. 1 and 2.

Additionally, while FIGS. 1 and 2 illustrate the use of multiple valves to route water through the systems 10, 110, other valve arrangements can be used, such as, for example, a single valve arrangement attached to the flow-through capacitor as shown in FIG. 4 in which the single valve performs the function of many of the valves shown in FIGS. 1 and 2.

Returning now to the description of FIGS. 1 and 2, on the inlet side of each capacitive deionization system 10, 110, a feed water inlet 12, 112 selectively provides water for filtration and deionization to a flow-through capacitor 26, 126. In the embodiment shown, the stream of water flows from the feed water inlet 12, 112 to the flow-through capacitor 26, 126 by passing through an inlet line having sequentially disposed thereon an iron filter 14, 114, a carbon and/or sediment pre-filter 20, 120, and an inlet isolation valve 16, 116 (when open). For the capacitive deionization system 10 of FIG. 1 there is also a pump 17 disposed between the iron filter 14 and the pre-filter 20 which can be used to maintain the pressure in the system 10. The pump 17 or pressure source can be differently placed or connected to the system 10 in other arrangements and so the illustrated embodiment is only one possible configuration of the system 10. The inlet line also includes a number of indicators and sensors including a pressure sensor 18, 118, a conductivity indicator 22, 122 and a flow transducer 25, 125 disposed between the inlet isolation valve 16, 116 and the flow-through capacitor 26, 126.

Many of the elements between the feed water inlet 12, 112 and the flow-through capacitor 26, 126 are optional. For example, the iron filter 14, 114 and/or the pre-filter 20, 120 may be absent and the feed water inlet 12, 112 can be directly coupled to or directly in communication with the inlet isolation valve 16, 116. Likewise, the iron filter 14, 114 and/or the pre-filter 20, 120 can be replaced with or supplemented by another pre-treatment process, if desired.

As will be described in more detail below with reference to FIG. 3, the flow-through capacitor 26, 126 is capable both of deionizing water by the removal of charged constituents from the water and of periodically discharging the collected constituents to regenerate the capacity of the flow-through capacitor 26, 126.

On the outlet side of the flow-through capacitor 26, 126, the stream of water exits the flow-through capacitor 26, 126 from an outlet line 52, 152 and passes through a number of components to ultimately arrive at either a treated water outlet 76, 176 or a drain 58, 158. The treated water outlet 76, 176 can provide treated water to, for example, a residential plumbing system, whereas the drain 58, 158 accommodates the disposal of impurity-rich or constituent-rich water during ion discharge, cleaning, or regeneration of the flow-through capacitor 26, 126. In some embodiments in which the system is being used to re-claim constituents (such as metals) from a water stream, the water from the drain 58, 158 may not be disposed but may instead be collected for further processing.

In both capacitive deionization systems 10, 110, the outlet line 52, 152 of the flow-through capacitor 26, 126 branches in one direction to the drain 58, 158 and in the other direction to the treated water outlet 76, 176. In the embodiments shown in FIGS. 1 and 2, the path of flow of the water from the outlet line 52, 152 is determined by the configuration of control valves after the branch. On the way to the drain 58, 158 and after the branch in the outlet line 52, 152, there is a drain control valve 56, 156 which, if open, places the outlet line 52, 152 in fluid communication with the drain 58, 158. On the pathway from the outlet 52, 152 to the treated water outlet 76, 176 and after the branch, there is a treated water control valve 62, 162 which, if open, permits water to flow toward the treated water outlet 76, 176. In the embodiments of FIGS. 1 and 2, only one of these two valves will be open, while the other will be closed.

Two lines provide routes for some or all water to be diverted around the flow-through capacitor 26, 126. The first of these lines is a blend line 88, 188 which can be used to selectively blend treated water that has passed through the flow-through capacitor 26, 126 with untreated water that has been diverted around the flow-through capacitor 26, 126 for delivery to the treated water outlet 76, 176. The blend line 88, 188 branches from a portion of the inlet line before the flow transducer 25, 125 and the flow-through capacitor 26, 126 and re-connects with the treated water outlet line after the flow-through capacitor 26, 126 and the treated water control valve 62, 162. Along the blend line 88, 188, there is a blend valve 90, 190 which can be used to select a flow of water that is permitted to pass through the blend line 88, 188.

The second circumvention line is a manual bypass line 84, 184 which can be used to entirely bypass the flow-through capacitor 26, 126 and blend line 88, 188 when the inlet isolation valve 16, 116 is closed. In the embodiment shown in FIGS. 1 and 2, the bypass line 84, 184 branches from the inlet line after the carbon and sediment pre-filter 20, 122 and provides the water downstream of the flow-through capacitor 26, 126. Along the bypass line 84, 184, there can be a manual bypass valve 86, 186 which is closed when the manual bypass line 84, 184 is not in use. If the system 10, 110 is to be circumvented or bypassed in order to, for example, perform maintenance or re-route water during a power failure, then the inlet isolation valve 16, 116 is closed (in some embodiments, a water outlet isolation valve, such as the valve 74 in FIG. 1, may also be closed) and the manual bypass valve 86, 186 is open to route water around the flow-through capacitor portion of the system.

Returning now to the description of the outlet side of the capacitive deionization systems 10, 110, it can be seen that the arrangements of the capacitive deionization systems 10, 110 differ downstream of the treated water control valve 62, 162. Most notably, FIG. 1 depicts a capacitive deionization system 10 having only a hydropneumatic storage tank 72, while FIG. 2 depicts a capacitive deionization system 110 that also has an atmospheric storage tank 163.

Looking first at the embodiment lacking the atmospheric tank in FIG. 1, there can be an optional pump (not shown) which pumps either the water that has passed through treated water control valve 62 (meaning that some portion of the water has been treated by the flow-through capacitor 26) and/or through the blend line 88. The upstream pump 17 can also provide a source of system pressure. This water is transported downstream through a line to the hydropneumatic storage tank 72 that receives and stores pressurized water. Pressure sensors can be connected to the hydropneumatic storage tank 72 to monitor the air or water pressure within the air chamber in the hydropneumatic tank 72. On demand, this hydropneumatic storage tank 72 delivers water under pressure to the treated water outlet 76. Additionally, a pressure sensor 66 and a conductivity indicator 68 are attached to the line between the treated water control valve 62 and an outlet isolation valve 74 that is located upstream of the hydropneumatic storage tank 72 and the treated water outlet 76.

In the configuration of FIG. 2, the capacitive deionization system 110 includes the atmospheric tank 163. Water passing through either the treated water control valve 162, the blend line 188, and/or the manual bypass line 184 is fed into that atmospheric storage tank 163 where the water can be temporarily stored. A conductivity indicator 168 can be coupled to the line feeding the atmospheric storage tank 163 from the treated water control valve 162 and the blend line 188. The atmospheric storage tank 163 can include one or more level sensors or switches 165, 167 that establish whether a minimum water level in the tank 163 has been achieved and/or whether a target maximum water level in the tank 163 has been reached. These level switches 165, 167 can also be used to determine whether the flow rate through the flow-through capacitor 126 is nominal or high. One benefit of an atmospheric storage tank 163 is that the tank 163 can be able to store relatively large volumes of treated water so that larger quantities of treated water can be supplied on demand to a connected point of use or plumbing system, even when the system is unable to treat a sufficient quantity and or provide a particular quality of water in real-time.

Water from the storage tank 163 can then be supplied to a pump 164 that pumps the water downstream through a check valve to an optional hydropneumatic storage tank 172. If there is a hydropneumatic storage tank 172, then a pressure sensor 170 can be connected to the hydropneumatic tank 172 and can sense the air or water pressure in the air chamber of the hydropneumatic tank 172. The pressure sensor 170 can provide a signal to the pump 164 indicating if more water needs to be pumped in order to maintain pressure in the tank 172. In the particular embodiment shown, there is also an optional ultraviolet (UV) treatment system 175 positioned downstream of the pump 164 and the hydropneumatic storage tank 172, but before an isolation valve 174 prior to the treated water outlet 176.

Although a hydropneumatic storage tank 172 is shown in FIG. 2, a substantially constant pressure can be maintained by instead using, for example, a variable speed pump or another variable pressure source.

Figure 3:
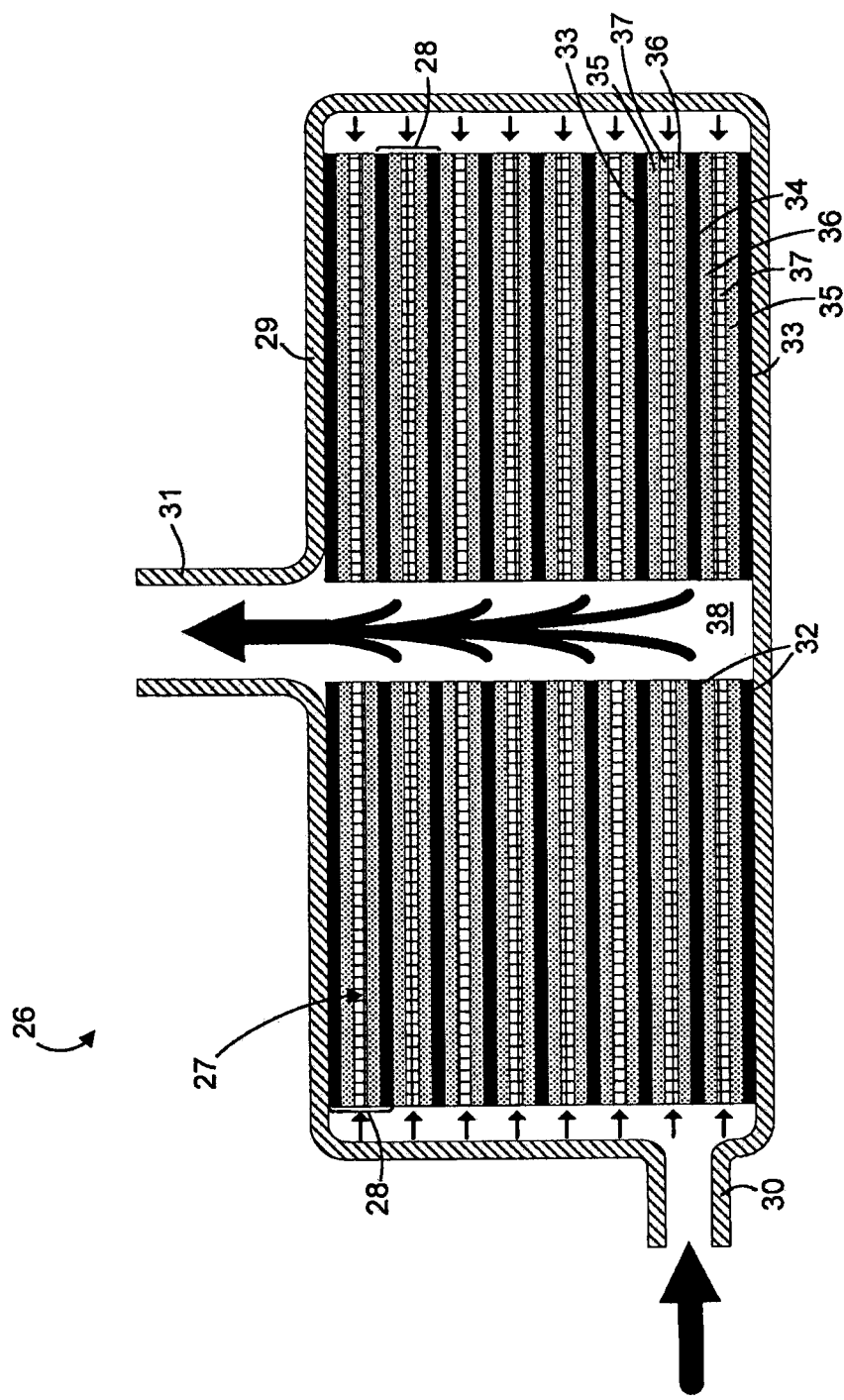
FIG. 3 is a schematic of a flow-through capacitor.

FIG. 3 schematically illustrates a flow-through capacitor 26 for the capacitive deionization of water. The flow-through capacitor 26 can be similar to the flow-through capacitor 126, and the illustration of FIG. 3 is only intended to provide a general understanding of the arrangement of the flow-through capacitor. The actual flow though capacitor can include various seals, connectors, sensors, and so forth which are omitted from the schematic for simplicity of description.

The flow-through capacitor 26 includes a stack 27 of individual fluid processing cells 28 which are contained in a housing 29 having a water inlet 30 and a water outlet 31. The flow-through capacitor 26 is configured so that, in order for water to pass from the water inlet 30 to the water outlet 31 of the flow-through capacitor 26, the water must pass through the stack 27 of individual processing cells 28. In the stack 27, the water can be deionized during treatment or receive constituents during discharge or regeneration. Each cell 28 in the stack 27 includes one or more of a combination of the following elements: electrode pairs 32, cation membranes 35, anion membranes 36, and flow spacers 37 which are typically made of a plastic mesh. While the cation and anion membranes can be used to provide improved attachment and storage of the constituents on the electrodes, the membranes are not required and the cells can be manufactured without them. Additionally, the electrode can be constructed to have a two-part electrode construction including a carbon adsorptive electrode layer and a current collector.

In the embodiment shown in FIG. 3, each of these cell elements is in the form of a relatively thin layer that is disposed in parallel with the other layers which are stacked upon one another in a repeating pattern of first electrode/cation membrane/spacer/anion membrane/second electrode/anion membrane/spacer/cation membrane. After the last cation membrane, there may be another first electrode and the pattern may be repeated. Since any flux of charged constituents occurs as the result of a voltage difference created between the first and the second electrodes, electrode layers can form the bottommost and topmost layers of the stack 27.

To better appreciate the description of the flow-through capacitor 26 that follows, it should be understood that FIG. 3 is a cross-sectional side view taken through the center of one example embodiment of the flow-through capacitor 26. The various cell elements are generally thin planar layers having central openings that align to form a central flow column 38. Accordingly, for any given layer, the cell elements on the left and right side of the central flow column 38 are part of the same layer. Moreover, water is able to flow between the inside of the vessel or housing 29 and the outer periphery of the cell elements of the stack 27. This means that the area between the housing 29 and the stack 27 on the left side and the right side of the schematic are in fluid communication with one another.

In FIG. 3, arrows generally depict the pattern of forward flow through the flow-through capacitor 26. Although a forward flow direction is shown, in some instances or operational cycles, water can be run through the flow through capacitor 26 in a reverse direction. In some embodiments, to achieve a desired flow pattern within the flow-through capacitor 26, there can be multiple water inlets or structures that promote an even or otherwise desirable water flow pattern through the flow spacers 37 in the stack 27. There can be additional structural elements that are used to position, electrically connect and/or compress some or all of the cell elements in the stack 27.

As also shown in FIG. 3, the flow-through capacitor 26 includes many electrode pairs 32. In one embodiment, each electrode pair 32 includes a first electrode 33 (which during treatment acts as a cathode) and a second electrode 34 (which during treatment acts as an anode). The electrodes 33 and 34 can be constructed from high-surface area electrically conducting materials such as, for example, activated carbon, carbon black, carbon aerogels, carbon nanofibers, carbon nanotubes, graphite, graphene, or mixtures thereof. In some embodiments, the electrodes 33 and 34 can be placed as a separate layer on top of a current collector or can alternatively be coated directly onto the current collector.

The first electrodes 33 and the second electrodes 34 are configured and electrically connected relative to each other to establish a voltage difference or potential there between. The first electrodes 33 in the flow-through capacitor 26 can be connected to one another and are then connected to a power supply. Similarly, the second electrodes 34 in the flow-through capacitor 26 can be connected to one another and are then connected to the power supply. Although not depicted in the schematic of FIG. 3, the electrodes can be connected to one another at their outer edges using peripheral tabs that contact one another or using other forms of connection. The stack 27 will be arranged so that nearest neighbor electrodes will be of different kinds (i.e., the first electrodes will be disposed between the second electrodes and vise-versa). In some embodiments, the various electrodes sets can be interleaved with one another and arranged so as to place multiple electrode pairs in series with one another.

Regardless of the specific electrical arrangement and connectivity of the electrodes, during operation these first and second electrodes 33 and 34 can be differently charged from one another to establish a voltage potential across the electrodes pairs. This voltage potential can be used to either draw charged constituents out of the water toward the electrodes (such as during treatment) or release the collected constituents back into the water (such as during regeneration, discharge or cleaning).

Cation membranes 35 and anion membranes 36 are positioned adjacent to the first electrode 33 and the second electrode 34, respectively. The cation membrane 35 and the anion membrane 36 act as charge barriers that can be placed between the electrodes 33 and 34 and the centrally-disposed flow spacer 37. The term "charge barrier" as used herein and in the appended claims refers to a layer of material that can hold an electric charge and that is permeable or semi-permeable for ions. Ions with the same charge signs as that in the charge barrier cannot pass through the charge barrier to the corresponding electrode. As a result, ions which are present in the electrode compartment adjacent to the charge barrier and which have the same charge sign as the charge in the charge barrier are at least temporarily retained or trapped in the electrode compartment. A charge barrier can allow an increase in ion removal efficiency as well as a reduction in the overall energy consumption for ion removal.

Finally, the plastic mesh flow spacer 37 is disposed between the cation membrane 35 and the anion membrane 36 (and the corresponding electrode pair 32). This mesh spacer 37 has a pattern similar to a window screen and also has some sections that are thicker than others sections in the height dimension (the height dimension is generally perpendicular to the direction of flow through the spacers 37) so that, when the spacer layer is lightly compressed between two other layers such as the cation membrane 35 and the anion membrane 36, water is able or permitted to flow across the spacer 37 layer and between the corresponding pairs of electrodes 33 and 34.

FIG. 3 is only a simplified schematic of the flow-through capacitor 26 and does not illustrate all of the mechanical components that can be part of the flow-through capacitor 26. For example, a flow-through capacitor will likely include tens or hundreds of electrode pairs to provide an appropriate amount of surface area for deionization of a usable amount of treated water. Moreover, while only a single stack is illustrated, multiple modules or trays of cell components can be constructed. In some embodiments (such as the module shown in FIG. 4), trays containing a number of electrode pairs can be stacked on one another and the trays separately or aggregately compressed.

Additionally, although not shown in the schematic of FIG. 3, the various layers of the stack are compressed to control the amount of space between the cell components, thereby establishing a cross-section area through which the water that can flow through the stack 27. This compression can be done in a number of ways. In one embodiment, a pressure plate at the top of the flow-through capacitor can compress the cell components or layers in a direction perpendicular to the direction of fluid flow through the stack 27. A pressure plate such of this type can be able to apply a variable compressive force by mechanical fastening (e.g., employing a threaded screw element which can be tightened or loosened to adjust compressive force). In other embodiments, the stack can be divided into multiple portions, such as in modules, with each portion being separately compressible.

In general operation, water flows enters the flow-through capacitor 26 via the water inlet 30 located on a bottom side wall of the housing 29. At this point, the water is able to flow through some volume between of the housing 29 and the stack 27. Some applied pressure differential (likely established by the continued inflow of water to the flow-through capacitor 26) will then cause water to be forced through the spacers 37 of the stack 27 and into the central column 38 at which point it flows upward and out of water outlet 31. By establishing a voltage difference between the electrode pairs 32, charged constituents such as ions can be transferred between the water flowing through the spacers 37 and the cation and anion membranes 35 and 36. The specifics of the control and operation of the cell will be described in further detail below.

FIG. 4 illustrates one embodiment of a portion of a capacitive deionization system 410 including a valve 402 positioned on top of a vessel 404 that houses a flow-through capacitor 426. In this embodiment, the valve 402 is coupled to the vessel 404 at a single location so that water can flow from the valve 402 into the vessel 404 and from the vessel 404 back into the valve 402 through separate channels. A flow pathway can established through the vessel 404 in which the entry and exit channels are provided at the same opening of the vessel.

In FIG. 4, arrows are used to indicate a forward flow of water through this section of the system 410. The arrows indicate flow from the valve 402 into a chamber 480 of the vessel 404, between the vessel walls and the flow-through capacitor 426, through the flow-through capacitor 426, up a central column 438 of the flow-through capacitor 426, up a central column 482 of a compression element 484 that compresses the stack of the flow-through capacitor 426, and returns the flow to the valve 402 to be routed to either a treated water outlet or drain. This forward flow is for the purposes of illustration only, and the specific direction of flow and the structure used to direct the flow can be different than that illustrated.

The valve 402 is a control valve assembly that performs multiple water-routing functions and can eliminate the need for multiple separate valves as shown in FIGS. 1 and 2. For example, the valve 402 can have multiple positions including the following: (1) a service position in which all water from an inlet line to the valve is routed into the vessel 404, through the flow-through capacitor 426, and then is directed to a treated water outlet (such as, for example, outlets 76, 176); (2) a blend position in which a portion of water from an inlet line into the valve 402 is directed into the vessel 404 and through the flow-through capacitor 425 while the remainder of the water from the inlet line is not routed through the flow-through capacitor 426 but is re-combined with the water that passes through the flow-through capacitor 426 to blend treated and untreated water; (3) a drain position in which water is routed through the flow-through capacitor 426 and then routed to a drain line to a drain (such as, for example, drains 58, 158); and (4) a closed position in which the outlet of the valve 402 is shut so that water does not continue to substantially flow through the valve 402 or the flow-through capacitor 426.

FIGS. 1 and 2 further illustrate that a processor or a controller 78, 178 is in electrical communication with the flow-through capacitor 26, 126 and many of the components of the capacitive deionization system 10, 110. The controller 78, 178 is connected to many of the sensors including the pressure sensor 18, 118, the conductivity indicator 22, 122, the flow transducer 25, 125, the pressure sensor 66, the conductivity sensor 68, 168, and level sensors or switches 165, 167. The controller 78, 178 is also connected to a number of valves including the drain control valve 56, 156, the treated water control valve 62, 162, and the blend valve 90, 190. The controller 78, 178 can also be connected to a power supply for the flow-through capacitor 26, 126. One having ordinary skill in the art will readily appreciate the fact that controller 78, 178 can potentially include one or more processors, microprocessors, programmable logic controllers, or other suitable software and hardware configurations. Additionally, in alternative embodiments, the controller can be connected to other system elements or not connected to some of the system elements depicted. Moreover, the controller 78, 178 can provide or be connected to a user interface for purposes of monitoring a water property (or water property concentration), monitoring system functions, adjusting set points used for system control, reviewing operating history, and providing diagnostics.

For example, with reference to FIG. 1, the controller 78 can provide control over the delivery of water to the hydropneumatic tank 72, when one is present. When one or more pressure sensors sense that the air or water pressure in the hydropneumatic tank 72 is below a lower set point, the controller 78 opens the control valve 62, turns on forward operation of the pump 17, and turns on the power supply for the flow-through capacitor 26 (provided that flow-through capacitor 26 does not require regeneration, as is described in further detail below) until the air or water pressure in hydropneumatic tank 72 reaches an upper set point for the pressure. If the flow-through capacitor 26 requires regeneration, then the controller 78 will close the control valve 62, and remove and/or reverse the charge provided to the flow-through capacitor 26 by the power supply. The controller 78 opens the drain control valve 56 when the ions removed during the regeneration mode are to be discharged via the drain 58.

The controller 178 can also provide control over the delivery of water to the atmospheric tank 163 for a system 110 such as shown in FIG. 2. The controller 178 can be connected to the low level sensor 165 and the high level sensor 167 on the atmospheric tank 163. When the high level sensor 167 senses that the water level in the atmospheric tank 163 is below its set point, the controller 178 opens the control valve 162 and turns on the power supply for the flow-through capacitor 126 (provided that the flow-through capacitor 126 does not require regeneration) until the water level in the atmospheric tank 163 reaches the upper set point of the high level sensor 167. If the flow-through capacitor 126 requires regeneration, the controller 178 can temporarily close the control valve 162, remove and/or reverse the charge provided to the flow-through capacitor 126 by the power supply, and open the control valve 156 so the ions removed during the regeneration cycle are discharged via the drain 158. If the water level in the atmospheric tank 163 falls below the lower set point of the low level sensor 165 and the flow-through capacitor 126 is unable to keep up with demand, then the controller 178 opens the blend valve 190 until the water level in the atmospheric tank 163 reaches the upper set point of the low level sensor 165, temporarily circumventing the flow-through capacitor 126 for particularly high water demand. In this instance, the conductivity sensor 168 can monitor the water entering the atmospheric tank to ensure that the water quality does not exceed a unacceptable level.

The level sensors 165, 167 can be used to measure and adjust a flow of water through the flow-through capacitor 26, 126. In some embodiments there can be one or more level sensors or switches that can be used to perform such operations or measurements.

Additionally, the controller 78, 178 can use measured qualities (e.g., pressures and conductivities) and related logic to perform various operations and provide instructions for, for example, opening and/or closing valves, routing the water stream either in full or in part through various lines of the system, and operating or adjusting operational parameters of the flow-through capacitor.

The underlying structure of some embodiments of the capacitive deionization systems 10, 110, 410 having now been explained, the general operation of the systems 10, 110, 410 and the various operational cycles of the systems 10, 110, 410 will be described in further detail.

General Operation

During typical operation, the capacitive deionization system 10, 110 and the flow-through capacitor 26, 126 cycles between four principal operating modes: a standby mode in which substantially no flow of water is processed by the flow-through capacitor 26, 126, a treatment mode in which the flow-through capacitor 26, 126 removes charged constituents from the stream of water passing there through, a regeneration mode in which the flow-through capacitor 26, 126 eliminates or discharges the collected charged constituents to regain capacity for further treatment, and a cleaning mode in which the flow-through capacitor 26, 126 is maintained to prevent scaling and other potential effects of long term cycling. The system 10, 110 can be configured to toggle between the standby, treatment, regeneration, and cleaning modes based on a number of criterion including, but not limited to, the demand for water (either in an attached hydropneumatic or atmospheric tank or in the greater plumbing system), detected feed water and treated water properties (e.g., water pressures, water conductivities, and so forth), and measured values of system parameters (e.g., properties relating to the operation of the flow-through capacitor).

To simplify understanding of the operation of the system for the purposes of this application, these four principal operating modes will be the most thoroughly described. The system is not limited to merely the described operational modes nor does the system necessarily need to include all four of the modes described in detail herein. The system can include other modes of operation such as, for example, diagnostic modes. Likewise, the system can include functionality that includes fault detection and/or permits the operation of the system during a power failure. Operation of the system can be either manually controlled (e.g., at the direct instruction of a user) or automatically controlled (e.g., according to pre-established programs). When the system is automatically controlled, it will be at the direction of the controller 78, 178 which has the ability to sense conditions in the system 10, 110 and to instruct or control the operation of various components of the system 10, 110.

The specific operation of the system will be described in further detail. It should be appreciated that any language describing operation of the system or flow-through capacitor, regardless of whether or not the controller is specifically mentioned, should be read as being possible to do with or through the controller. For example, if the system is described as monitoring a current value, this monitoring function can be performed by the controller. Likewise, when the system or flow-through capacitor operation is changed, instructions can be provided by the controller.

Current-Regulated Operation

The basic principle of operation in capacitive deionization systems has been that charged constituents can be transferred between the water and the electrodes (and/or membranes) of a flow-through capacitor by controlled and selective application of a voltage differential between the electrodes. Since the voltage difference or voltage potential is the "driver" of ion transfer, prior systems have focused on controlling or regulating a voltage potential to operate the capacitive deionization system.

Methods of controlling operation of a capacitive deionization system and controllers for a capacitive deionization system are disclosed. Among other things, the disclosed methods and controllers utilize a different mode of operating a flow-through capacitor than that which is found in conventional systems. Whereas conventional systems aim to regulate the voltage potential established across the electrodes, the methods and controllers described herein rely on the control and monitoring of current. By integrating the current or other value over the time of operation, a capacitive deionization system can be operated in such a manner as to more accurately reflect the actual state of the capacitor.

The methods, systems, and controllers described herein apply a new and uniquely different methodology to the operation of a capacitive deionization system. Instead of controlling and maintaining a specific voltage potential or differential between the electrodes during the transfer of ions or charged constituents, the methods, systems, and controllers of some embodiments of the invention monitor and regulate the current of the flow-through capacitor during the operation of the system. Since the flux of charged particles directly relates to the current and amount of treatment or discharge occurring, current-regulated control is a useful proxy by which to run and measure capacitive deionization system operation. Although a voltage is applied to create the potential across the electrodes in the flow-through capacitor, the applied voltage is selected to obtain a particular current in the flow-through capacitor at given point in the cycle. In the instances in which constant current is to be maintained in the flow-through capacitor, this means that voltage varies as the electrodes tend toward saturation and a greater voltage potential must be established to maintain constant current.

Among the advantages realized by current-regulated operation (as opposed to voltage-regulated operation) is that by integrating the current transferred over the length of a single operational cycle it is possible to determine an aggregate amount of ions or charged constituents that have been collected on or discharged from the electrodes and/or their corresponding membranes. This amp-second value or "ampsum", which is the integrated amperage value over time, can be compared to a known or calculated total useful capacity of the flow-through capacitor to determine when the electrode pairs of the flow-through capacitor have been saturated (i.e., approached their useful treatment limit) or de-saturated (e.g., approached a point at which most or all ions or charged constituents have been discharged).

Accordingly, current-regulated operation provides a yet-unrealized methodology to control operation of a capacitive deionization system and a metric by which to enable superior efficiency of the capacitive deionization system. By using current-regulated operation, the system can be configured to not continue to apply a voltage potential when minimal or no transfer of ions or charged particles is occurring. This prevents, for example, the continued application of a voltage difference in treatment mode when a saturation point of the flow-through capacitor has been reached.

Instead of directly monitoring and integrating current to establish the duration of a cycle and the capacity of the flow-through capacitor, a water property, value, characteristic, or parameter can be used (or a concentration thereof). For example, by measuring the conductivity of the water stream or the conductivity removed (by comparison of the water before and after processing by the flow-through capacitor) and integrating this value over the time duration of a cycle, the amount of capacity utilized in the flow-through capacitor can be indirectly measured. Accordingly, in some embodiments of the method of the invention, the "current" measurement and calculation can potentially be replaced by other measured water qualities or properties, such as for example, conductivity or hardness. To the extent that such characteristics, values, or parameters correlate with current (i.e., conductivity of water depends in part on the number of ions in the water), they can serve as good proxies for operation.

Figure 5:
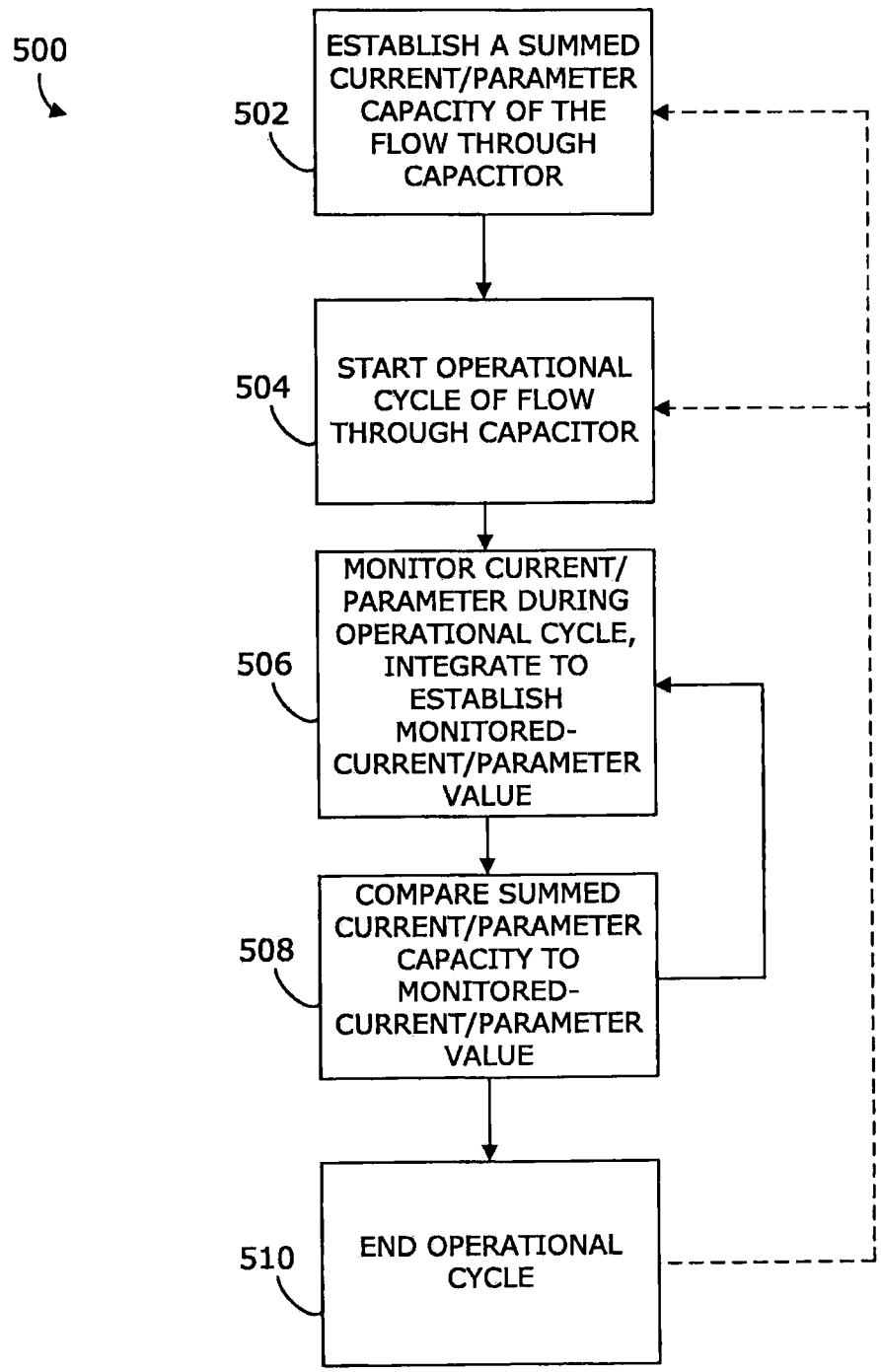
FIG. 5 is a process flowchart illustrating the general operation of a capacitive deionization system with a flow-through capacitor according to one form of the inventive method.

FIG. 5 illustrates a method 500 of current-regulated operation according to one embodiment of the invention. It will, however, be appreciated, that rather than measuring and adjusting current another parameter can be controlled such as, for example, a water property (e.g., conductivity). According to the method 500, a summed-current capacity of the flow-through capacitor is established in step 502. The summed-current capacity corresponds to a useful capacity of the system. To draw an analogy, this summed-current capacity corresponds to the amount of ions or charged constituents the electrodes can support in the same way that one could determine the amount of water that a sponge could absorb (either empirically or by calculation).

This summed-current capacity can be, for example, theoretically calculated based on qualities and traits of the capacitive deionization system (e.g., using physical and chemical values and/or design parameters such as the number of modules, stack size, number of electrodes pairs, cell area and surface properties).

Alternatively, the summed-current capacity can be established by observation or measurement. For example, the system can be run in treatment mode until the flow-through capacitor has reached a point of saturation or the water reaches a property limit (which can be determined by comparing the difference between the input and output water conductivities, as conductivity correlates with the number of ions in the water). The flow-through capacitor can then be set to regenerate until all ions and charge constituents are driven from the electrodes/membranes. During either treatment or regeneration, the current can be integrated over time until no or little additional current is transferred. This measured value would correspond to the usable summed-current capacity.

In some embodiments, the system can use both methods and/or continue to periodically re-calculate or re-establish the summed-current capacity. For example, the system can initially operate using a theoretical value and then begin to monitor treatment or discharge cycles to further refine the summed-current capacity value. In other embodiments, the system can continually or periodically monitor discharge or regeneration cycles to re-establish or revise the summed-current capacity for each subsequent treatment cycle. In still other embodiments, the system can continually or periodically monitor treatment cycles to re-establish or revise the summed-current capacity. The flow-through capacitor can be operated through multiple operational cycles until an equilibrium capacity is reached or approached.

The system and controller can be permitted to operate at an imbalance between discharge and treatment cycles so that more energy is stored in each treatment cycle than is discharged in the subsequent discharge cycle until enough of the capacity is used to achieve an optimum regeneration cycle. Thereafter, the system can operate in balance with the energy discharged and the energy stored in each cycle to be approximately equal.

In capacitive deionization systems, the summed-current capacity can typically be between approximately 1000 amp·seconds and 2200 amp·seconds per stack and the area of the electrode pairs for each stack can be approximately 5800 square centimeters. However, systems having higher or lower capacities can be also used. It will readily be appreciated that design parameters can affect the summed-current capacity of a particular system.

Once a summed-current capacity is established according to step 502, then an operational cycle of the flow-through capacitor can be started according to step 504. This operational cycle can be, for example, the treatment mode, the regeneration mode, or the cleaning mode.

This operational cycle need not immediately occur after establishing the summed-current capacity. For example, after establishing the summed-current capacity, the system can be in a standby mode until there is a demand for treated water. Moreover, this operational cycle need not be completely continuous. For example, a treatment mode can be started based on the demand for water and then stopped temporarily until more water is needed.

Once the operational cycle has been started, the controller monitors the current and integrates the current over the time of the operational cycle to determine a monitored-current value according to step 506. Over the course of the operational cycle, this monitored-current value is compared to the summed-current capacity according to step 508 to determine whether (1) to continue to operate in the particular operational mode if an endpoint condition has not been reached, in which case the system continues to monitor current according to step 506 and then re-compare the summed-current capacity and monitored-current value according to step 508 until the endpoint condition has reached or (2) to end the operational cycle according to step 510 if the endpoint condition has been reached. The condition that results in the termination of the operational cycle at the endpoint can be, in one embodiment, when the summed-current capacity is equal to the monitored-current value. In some embodiments, this can mean integrating and counting up to the monitored-current value to the summed-current capacity. In other embodiments, this can mean subtracting the monitored current value from the summed-current capacity until the resultant value is equal to zero.

Some ions or charged constituents may be strongly connected to the electrodes and/or membranes during treatment. As a result, there can also be logic that permits the cycle to be terminated if the endpoint has been substantially reached, although not achieved. For example, after a period of discharge, a relatively small percentage of charged particles may not separate from the electrodes and/or membranes due to the strength of their attachment. The system and controller can be configured to terminate the cycle if the summed-current value is within, for example, 5% of the endpoint and remained substantially at that summed current for a predetermined length of time. Such logic can prevent the system from becoming locked in a particular operational mode when transfer becomes inefficient (or perhaps even impossible) due to changes in the capacity of the flow-through capacitor.

In some embodiments, the system can undergo a partial treatment cycle and then, after a specified duration of inactivity, enter a discharge cycle to discharge only the collected amount of charge. In these embodiments, the monitored-current capacity during discharge can be compared to the final monitored-current capacity in the prior treatment cycle. Such operation can be used to restore the flow-through capacitor to its full capacity during lengthy periods of non-use or standby.

During continuous demand for treated water which exceeds the total available capacity for the flow-through capacitor, a switch between the treatment mode and regeneration mode can be based on the comparison of the summed-current capacity and the monitored-current value. For example, when there is a demand for water, the system can operate in the treatment mode until the monitored-current value is equal to summed-current capacity. At this point, the system can determine that no further useful treatment can be performed without first discharging the collected ions and constituents. Accordingly, the system can switch to the regeneration mode in which ions will be discharged from the flow-through capacitor until the comparison of the summed-current capacity and the monitored-current value indicates that the regeneration cycle should be stopped because an endpoint of the cycle has been reached (i.e., all ions or charged particles have been discharged).

Alternatively, instead of comparing a summed value to a capacity value during regeneration, a fixed time regeneration cycle can be used. When a fixed time is used, certain assumptions are made about the rate at which constituents are discharged that, when valid, simplify the regeneration cycle. For example, if the system is set to 20 amps and the regeneration cycle is run for a fixed time duration of 90 seconds, then (given efficient transfer of the constituents from the electrodes to the water) 1800 amp-seconds of capacity can be assumed to be regained.

The controller can be programmed so that under certain conditions (e.g., high measured input or output water conductivities corresponding to high levels of constituents and the flow-through capacitor having sufficient, but not full, regeneration), the system can be allowed to return to the treatment mode without fully completing the discharge/regeneration cycle. Again, because current-regulated control of the system provides an accurate metric of the available capacity of the flow-through capacitor, complex logic such as this can be employed in system operation which was previously unavailable or in which available capacity would be, at best, a guess.

Figure 6:
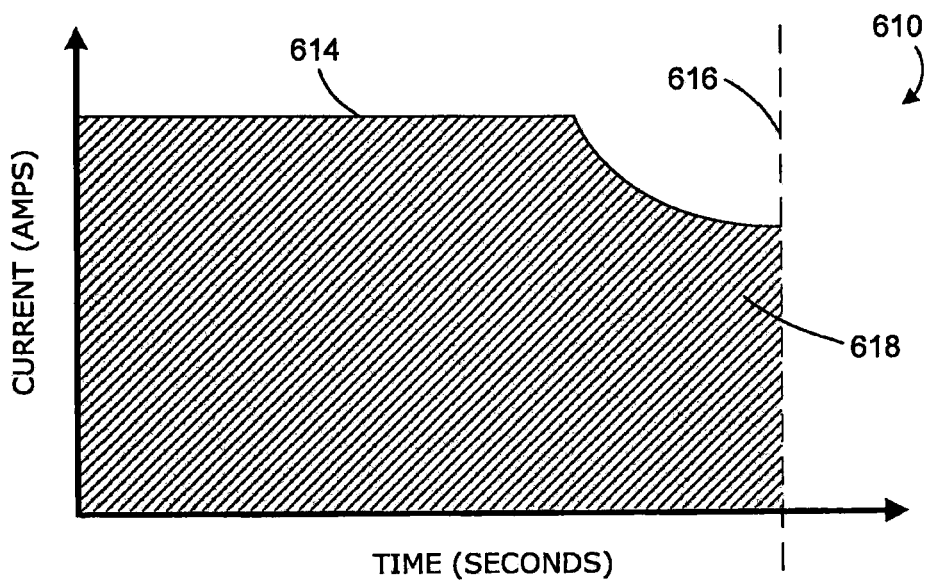
FIG. 6 is a graph of indicating the current and voltage values of the flow-through capacitor over one example of an operational cycle.
Figure 6:
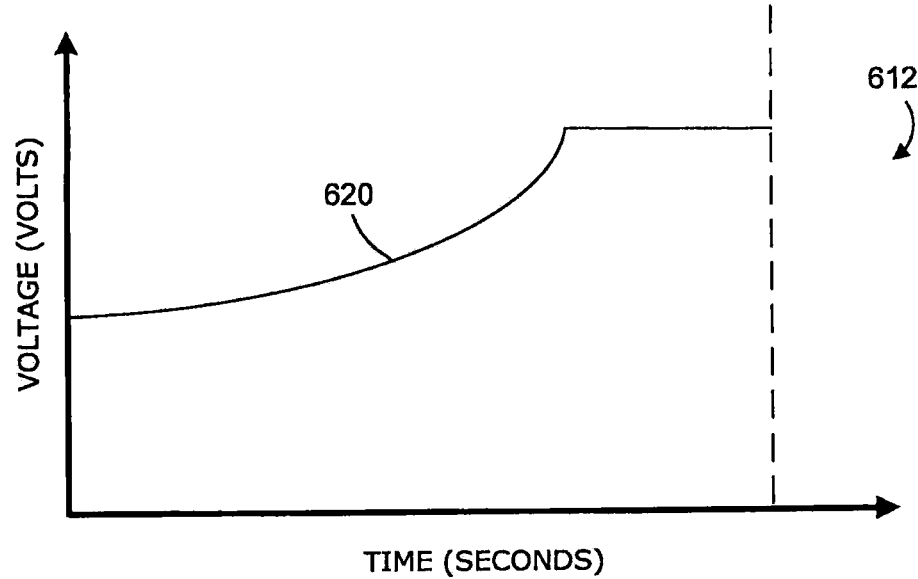

FIG. 6 illustrates one embodiment of an operational cycle in which the current and voltage over the time or duration of an operational cycle. The top chart 610 illustrates current over time and the bottom chart 612 illustrates voltage potential or difference over time.

As shown in the top chart 610, a current-time line 614 depicts the current measurement over the time of the cycle, which ends at a time 616 indicated by the dashed line. The current or amperage is held constant over at least a first portion of the cycle until it begins to taper off near the end of the cycle at a second portion. However, in some embodiments, the current can be held constant over the entire length of the cycle (for example in a system having 1800 amp·seconds capacity, a treatment cycle can be at 20 A for 90 seconds).

One reason that the current can be held constant is to provide a relatively constant flux of ions and charged particles over the duration of the cycle. In some embodiments, however, current can be adjusted for actual operating conditions such as, for example, variations in feed water conditions such as conductivity and flow rate. For example, if a flow rate of water flowing through the flow-through capacitor increases, then it may be desirable to increase the current to increase the flux of ions and charged particles between the electrodes and/or membranes and the water. Likewise, a significant change in the observed conductivity of the water (indicative of a different amount of ions or charged constituents) can dictate an increase or decrease in the current or amperage level to obtain or maintain the desired water property or water property concentration in the treated water. The current or amperage level can also be set or adjusted based on a treated water property or water property concentration, such as treated water conductivity.

Still referring to the top chart 610, the shaded area 618 corresponds to the total amp·seconds or ampsum of the cycle (i.e., the integral of current over time). As discussed above, through the course of the cycle, the integral taken from a zero time at the start of the cycle to a present time in the cycle is the monitored current value which is then compared against the summed-current capacity to determine the end point or time of the cycle. With line 616 being the end time, the integral under the amperage curve from the zero time to the end time (depicted as shaded area 618) also corresponds to the summed-current capacity of the particular system.

As shown in the bottom chart 612, a voltage-time line 620 is used to depict the voltage over the time of the cycle. If the current or amperage is held constant, then the voltage may need to be increased over the duration of the cycle to maintain a constant rate of ion flux. This may be a result of, for example, a decrease in the effectiveness of the applied voltage as the electrodes and/or membranes saturate with ions or charged constituents. At some point over the cycle, it is possible that a maximum voltage differential is reached based on the power limitations of the system. When this happens, voltage may peak at a constant level and the flux of ions or charge may begin to decrease as the constant voltage is of decreasing effectiveness as time further progresses.

Formulas can be employed to convert the electrical capacity of the capacitive deionization system to an ion capacity based on mEq (milliequivalents) and visa versa. Such formulas can be used to convert ampsum information to useful information that can be passed to the end user by the controller.

Standby Mode

When the system is not transferring ions, it can be placed in a standby mode. In the standby mode, the capacitive deionization system 10, 110, is in such a state that water is neither flowing into nor out of the system 10, 110 (or at least in such an appreciable quantity as to require processing of the water). Since no water is actively flowing through the flow-through capacitor 26, 126, it is not necessary to either draw constituents out of the water as happens during treatment or flush constituents from the capacitor into the water as happens during regeneration or cleaning. Even in this steady state condition, some amount of voltage difference can be applied across the electrode pairs 32 so that constituents do not migrate out of the cation membranes 35 and the anion membranes 36 and into the water standing in the flow-through capacitor 26, 126.

In addition to preventing scaling when the system is in standby, an applied voltage potential helps to prevent poor water quality on start up. This is because ions are less likely to migrate into the standing water in the flow-through capacitor. After a particularly long period of standby, the system can be configured to send a predetermine volume of water to the drain in order to ensure that the initial volume water sent to the treatment outlet has not become impurity or constituent rich while sitting stagnant in the flow-through capacitor or another portion of the upstream plumbing.

Treatment Mode

When there is a demand for treated water and water is flowing through the flow-through capacitor 26, 126, the system 10, 110 can enter the treatment mode or purification mode. In the treatment mode, at least a portion the water or solution passes through the flow-through capacitor 26, 126 with a voltage potential applied in the normal direction so that ions and compounds or particles that exhibit charge attraction are attracted to the electrode pairs 32. These constituents are drawn out of the stream of the water and pass through the cation membranes 35 and the anion membranes 36 and are captured on the carbon electrodes 33, 34. The stream of water, now having a portion of the constituents removed, can exit the flow-through capacitor 26, 126 in a comparably pure state to the water that enters the flow-through capacitor 26, 126 and the treated water can be routed to the treated water outlet 76, 176.

Many variables can effect the rate and quantity of the ions and charged constituents removed from the water during treatment, including, but not limited to, the voltage potential established over the electrode pairs 32 (and the related amperage which is, in fact, the regulated portion of the capacitor), the flow rate at which water flows through the flow-through capacitor 26, 126, the flow pattern through the flow-through capacitor 26, 126, the inlet water quality, and to what extent the constituents have saturated the membranes and/or electrodes. The flow rate can be adjusted using one or more valves, can be variable within minimum and maximum limits determined by the module configuration and/or operating conditions, and can be based at least in part on a demand for treated water. The amperage of the flow-through capacitor is determined by the controller 78, 178.

As a general rule, as the flow rate decreases and/or the amperage increases, more ions or charged constituents per unit volume will be transferred between the water passing through the flow-through capacitor and the electrodes. Conversely, as the flow rate increases and/or the amperage decreases, fewer ions or charged constituents will be transferred per unit volume of the water.

Figure 7:
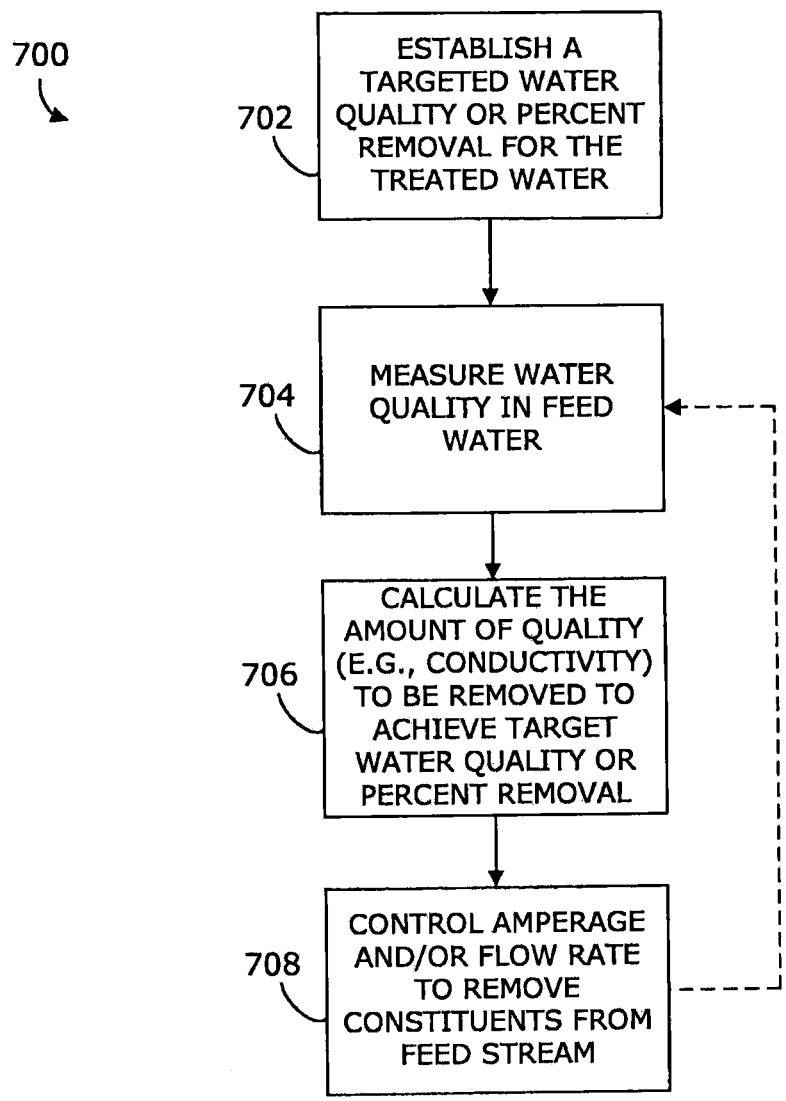
FIG. 7 is a process flowchart illustrating a treatment cycle according to one aspect of the inventive method.

One method of treatment 700 is illustrated in FIG. 7. According to the method 700, a targeted water property (or water property concentration) or conductivity or a fixed percentage removal of a water property (or water property concentration) or conductivity can first be established for the treated water according to step 702. Then, some property of the water, such as the conductivity of the feed water (although other qualities can also be used), is measured according to step 704. Since the capacitive deionization system removes ions and charged particles to make the water more pure to a desired water property, the controller is then able to determine the amount of conductivity that must be removed from the feed water in the flow-through capacitor to achieve the target water property (i.e., the treated water conductivity) or a percentage removal in step 706. Based on this conductivity to be removed, the controller can control one or both of the current or amperage of the flow-through capacitor and the flow rate of water through the flow-through capacitor to achieve the desired resultant property in the treated water stream according to step 708. The conductivity of the treated water can be measured to confirm the effective removal of ions and charged constituents. There can be limits on the treatment level achieved. For example, water that is too pure could cause issues with residential plumbing, and cause too much resistance in the cell, which would result in high voltages required for treatment and less efficient treatment.

Once a particular water property or percent removal is targeted or selected, a volume can be calculated that corresponds to the amount of water that can be fully treated in a treatment cycle given that property (e.g., conductivity) in the feed water. Such a volume can be established by considering the summed-current or total usable capacity of the flow-through capacitor (which represents the amount of charge that can be received from the water) and amount of conductivity to be removed from the water (which corresponds to the amount of ions or charged constituents to be removed per unit volume of water to achieve a desired water property). In some installations or points of entry, it can be acceptable to assume that the feed water conductivity will remain relatively constant and so the controller can use this calculated volume as a basis for determining the length of the treatment cycle. Under such conditions, the amperage can be adjusted or varied based on the flow rate to continually remove a particular charge per unit volume of treated water so that the treatment cycle is set to end when the calculated volume of water has been treated.

According to some embodiments of the method, the flow rate through the system can be determined by and, in some instances, change with the demand for treated water. The demand for water can be provided by monitoring the pressure in the hydropneumatic water tank and/or the tank water level in an atmospheric tank. If the pressure or water level drops below a certain threshold level, there is generally increased demand for treated water. It is possible that demand can be observed as a binary condition (i.e., either more water needs to be treated or it does not) or that there can be various levels of water demand, either stepwise or continuous, based on an observed pressure or level sensor value. For example, the degree or amount of pressure drop in a hydropneumatic tank can be used to establish the magnitude of the demand for water. Additionally, a flow sensor or sensors can be used to determine the demand for water.

In low demand situations, the system can generally meet the demand for treated water. In such instances, the flow-through capacitor can be instructed to only treat the water to a targeted water property or percentage removal to save energy and capacity of the flow-through capacitor or can be instructed to treat the water to be as pure as possible. Moreover, in some instances, treated water can be re-circulated one or more times to further remove constituents from the water.

In high demand situations, the flow rate of the water to be treated can exceed the ability of the flow-through capacitor to process the water to the desired property. When this happens, the system can treat the water to the extent possible and allow the treated water to be of less than the desired quality or purity. This may be preferable to not providing water in a sufficient quantity to meet point of use demand. The removal rate can be lowered by allowing the system to operate at a treatment current or amperage less than the current calculated to provide the design removal percentage. Likewise, to prevent the cell of the flow-through capacitor from exceeding its maximum operating voltage, the targeted change in feed water conductivity or other measured property can be limited. The controller can be set to end the treatment cycle if a preset or calculated treated volume is exceeded, a time length of cycle has been exceeded, and/or maximum voltage has been reached.

It is also contemplated that varying the flow rate in a cycle can help loosen or remove scaling and/or fouling during treatment. Particularly, in instances in which the water is being stored prior to use, it can be beneficial to cycle the flow rates between higher and lower values to alter flow patterns and the applied shear force of water on the surfaces of the flow-through capacitor.

Additionally, various aspects of the treatment cycle can be used or considered to adjust the summed current capacity of the system. For example, over the course of the treatment cycle, the time to reach the maximum voltage can be determined. A decrease in this time over various cycles can indicate a loss of capacity in the flow-through capacitor. As still another example, the percentage of the summed-current capacity realized before the maximum voltage is reached can be used to determine a loss of capacity of the system. As the percentage of system capacity used before maximum voltage is reached decreases, so does the usable capacity of the flow-through capacitor. Based on either of these observed conditions, the summed-current capacity of the system can be adjusted and/or the regeneration cycle can be triggered.

In another embodiment of the treatment mode, the treated water conductivity (as opposed to the feed water conductivity) can be measured to determine whether to adjust the amperage of the flow-through capacitor. Given that feed water quality may be relatively constant, it may be acceptable to adjust the amperage up or down based solely on the measured treated water conductivity. Such an adjustment can be suitable to accurately adjust the conductivity to be removed, even in situations where the feed water conductivity is unknown.

In still other embodiments, a water property other than water conductivity can be used as the basis for determining the amperage at which to run the flow-through capacitor. For example, a pH or alkalinity of the water can be used as a monitored water property.

Moreover, in the event that the treated water purity is believed to be approaching a minimum acceptable water property or is continually running below the target water property, the system can be set to alarm or store the event as a fault condition. This can alert the user to a deficiency in the system and a need for maintenance of the system or the inability of that particular size of system to continually meet the demand for treated water at that point of use.

Regeneration Mode

Once the electrodes become saturated with ions during the treatment mode, the electrodes 33, 34 can have their capacity regenerated during a regeneration cycle. During regeneration, the electrode pairs 32 are shorted or the voltage potential is reversed and the ions (and compounds or particles that exhibit charge attraction) are driven off of the capacitor's electrodes 33, 34 and/or the membranes 35, 36.

This process forms an impurity or constituent-rich concentrated solution in the flow spacer 37 which is then hydraulically discharged from the flow-through capacitor 26, 126 typically through the drain 58, 158. The water carrying the discharged constituents will be directed to a waste water output or drain 58, 158 until substantially all the constituents are released or the target capacity is restored (although some constituents may be so strongly attached to the electrodes and/or membranes as to not be readily detachable). Once some or all of the capacity of the flow-through capacitor 26, 126 is recovered, then the flow-through capacitor 26, 126 is again ready for ion or impurity removal in the treatment mode.

The ions released by the electrodes can include hardness ions, such as calcium, and alkalinity ions, such as carbonate and bicarbonate ions. If the concentration of these ions in the waste water becomes too high, these ions can precipitate and form scaling on the spacer 37. Scaling in a flow-through capacitor can clog up the water flow path and possibly also contaminate the electrodes, particularly the cathode. This may negatively influence the performance of the flow-through capacitor or even cause the flow-through capacitor to stop working. While periodic regeneration and cleaning helps to improve the usable life of the system, it ideally should be performed in such a way as to not impair the long-term performance of the system by forming scaling.

In some embodiments, to improve the efficiency of the regeneration cycle, the regeneration mode can be performed with clean water, purified water and/or chemicals to clean the system. However, in the most basic embodiment, feed water can serve as the transport agent for the discharged ions.

During some forms of regeneration, the system or controller can compare a monitored-current value (i.e., the ampsum of the discharged ions) during the regeneration cycle to the final monitored-current value of the previous treatment cycle or the summed-current capacity of the flow-through capacitor to determine the endpoint of the regeneration cycle as described above. The monitored-current value for the regeneration cycle is an integral of the current over time which will correspond to the amount of charge constituents transferred from the flow-through capacitor to the water stream over the time of the regeneration cycle.

In some embodiments, the regeneration mode can be initiated and all steps within the regeneration mode can be started or terminated based on time and/or a change in the water property as measured by (without limitation) conductivity, pH, ORP (oxidation-reduction potential), specific ion electrode or other means. Moreover, one or more of feed water hardness, pH, alkalinity and conductivity can be measured and used as a basis to calculate a maximum discharge conductivity under which the potential for scaling is reduced.

While the net ion flux during the regeneration cycle will be from the electrodes and/or membranes into a discharged stream of water, the current or amperage and the flow rate can vary over the length of the cycle. For instance, the regeneration cycle can have portions where the electrodes are shorted, where the electrodes are set to a reverse polarity, and even where the electrodes are temporarily set to a normal polarity. Additionally, the flow rates can be adjusted in magnitude (low rates and high rates) and direction (forward, reverse, and no flow). In some embodiments, to reduce water usage, but to maintain a flow, water can be, at least to some extent, re-circulated through the flow-through capacitor during regeneration.

Figure 8:
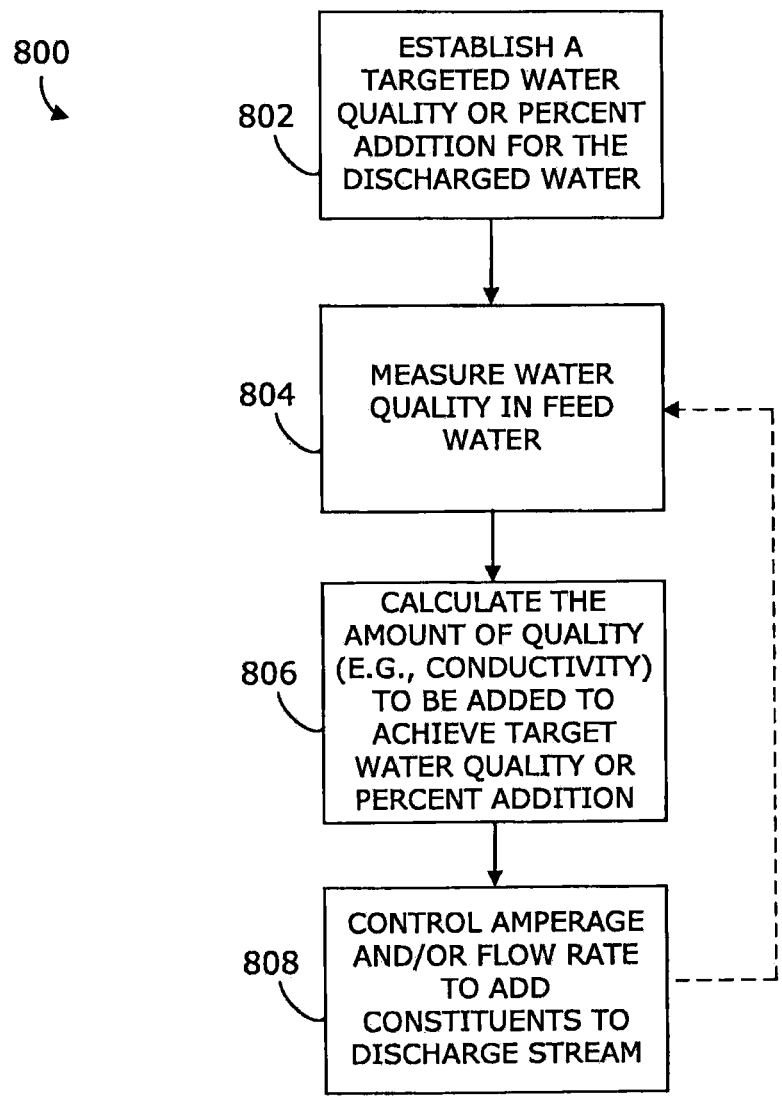
FIG. 8 is a process flowchart illustrating a regenerative cycle according to one aspect of the inventive method.

The concentration of ions or charged constituents in the discharged water can be controlled to reduce the potential for scaling and/or to provide time efficient discharge of the collected ions and charged constituents according to the method 800 illustrated in FIG. 8. As with treatment, the flow rate and amperage can be controlled to adjust the rate at which ions and charged constituents are transferred into the water and the volume of water exposed to this ion flux.

According to the method 800, a targeted water property (e.g., a maximum impurity level of the discharge stream) or percent addition of constituents can be established according to a step 802. This property in the feed water (e.g., a conductivity of the water) can then be measured according to step 804 before it is received in the flow-through capacitor. According to step 806, the targeted water property and the measured feed water property can be compared to determine what amount of the property, such as conductivity in the form of ions, can be added per unit volume of the feed water to provide a discharge stream having the targeted water property or added percentage of the water property of interest. Based on this calculated value, the flow rate through the flow-through capacitor and/or amperage of the flow-through capacitor can be altered according to step 808 to add the impurity to the discharge stream from the electrodes and/or membranes in the flow-through capacitor.

Accordingly, in one embodiment of the method, by controlling the discharge amperage or amperage set point, measuring the feed water conductivity or other water property parameter, calculating the ion transfer rate from the discharge amperage, calculating the flow rate required to control concentration of the discharged water and using a valve or other method to control the water flow to achieve that flow rate, the concentration and/or amount of the impurity transferred to the discharged water can be controlled. Similarly, the concentration and/or amount can be changed by adjusting the current or the current set point based on the discharge water rate and the measured feed water conductivity or other water property parameter based on the calculated ion transfer rate. Formulas can be used to calculate flow rates for dilution in regeneration based on feed water conductivity and ion discharge rate.

According to one embodiment of regeneration, multiple flow rates can be used to save water while simultaneously preventing the concentration of ions and/or constituents in the water from exceeding a maximum allowable concentration. The flux of ions and constituents into the water will initially be high and then decrease over the length of the regeneration cycle. This means that the water flowing through the flow-through capacitor can initially be provided at a high flow rate to receive and transport the initial high levels of ion flux. As ion flux decreases, the flow rate can be reduced because fewer ions need to be transported out of the flow-through capacitor per unit time. Accordingly, at the end of the regeneration cycle, the water can dwell within the flow-through capacitor for a longer time than at the beginning of the cycle without approaching the maximum acceptable impurity level for discharged water.

In some embodiments of the regeneration mode, the flow rate of the water can be pulsed to reduce the amount of water used or to provide variable flow rates to inhibit scaling. As described above with respect to the treatment mode, toggling high and low flow rates can be used to loosen or remove scaling and/or prevent fouling during regeneration.

In still other embodiments of the regeneration mode, flow can be temporarily reversed during ion and charged impurity discharge. If the flow is reversed, it is possible that the drain can be disposed upstream of the flow-through capacitor, so that the impurity or constituent-rich water flowing in reverse can be removed from the system prior to the flow-through capacitor.

The controller can limit various aspects of the operation of the flow-through capacitor during the regeneration mode. For example, the regeneration flow rate can be variable with minimum and maximum limits determined by module configuration and controlled by the valve configuration. Additionally, the regeneration mode can be set to terminate based on a number of factors including excessive length of time, excessive amperage, or comparison of the monitored-current value to a final treatment monitored-current value or a summed-current capacity of the system. Likewise, these conditions can be used as suggested above to alter the summed-current capacity of the flow-through capacitor.

Additionally, the controller can be configured to ensure that the flow rate does not go below a minimum regeneration flow rate set to ensure water distribution throughout the cells. If the flow rate were to become too low during regeneration, localized areas of highly concentrated discharge water could be created which could result in undesirable scaling on, for example, the flow spacer.

Cleaning Mode

As briefly mentioned above, once attached to the electrodes and/or membranes, some ions may not be easily removed. These ions may require something more than a standard discharge cycle to be removed. Although a higher loading of ions has been found to actually improve the kinetics of ion transfer during transfer, too many strongly attached ions can have an adverse effect on the capacity of the system.

Accordingly, the system can occasionally enter a cleaning mode in which the system undergoes more time intensive regeneration processes. These can include longer regeneration modes with greater voltage differences or pulsing voltages, variable flow rates, the use of a cleaner or other process variations to remove hard to detach ions from the electrodes/membranes.

The system and controller can be set to automatically enter a cleaning mode when one or more of a number of conditions are met including, but not limited to, a threshold number of cycles have been performed, a threshold treated volume of water has been processed, the system has remained in standby for a duration of time, a significantly high pressure drop is observed over the flow-through capacitor, a time or window of time of the day is occurring, and a loss of capacity is observed.

If the system is unable to restore the system capacity to a particular level during cleaning, the system can be set to provide a loss of capacity alarm. Such an alarm can help the end user to determine when components need to be replaced or otherwise maintained.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

What is claimed is:

1. A method of removing ions from a feed water stream using a flow-through capacitor having at least a pair of electrodes spaced from one another to accommodate a flow of water and configured to transfer ions between the pair of electrodes and the water, the method comprising:
    establishing a target value for a water property concentration for a treated water stream exiting the flow-through capacitor;
    measuring a feed value for the water property concentration in a feed water stream entering the flow-through capacitor;
    calculating an amount of the water property concentration to be removed from the feed water stream based on the feed value to achieve the target value for the water property concentration in the treated water stream;
    controlling an amperage of the flow-through capacitor and a flow rate through the flow-through capacitor to remove ions from the feed water stream to achieve the target value for the water property concentration in the treated water stream; and
    wherein an end point of a treatment cycle is established by a comparison of a monitored-current capacity of the flow-through capacitor over the duration of the treatment cycle to a summed-current capacity of the flow-through capacitor that is pre-established.

2. The method of claim 1 wherein the amperage is a function of an amount of ions to be removed from the feed water stream.

3. The method of claim 2 wherein the amount of ions correlates to the amount of the water property concentration to be removed from the feed water stream.

4. The method of claim 2 wherein the amperage is further a function of the flow rate.

5. The method of claim 1 wherein the water property concentration correlates to conductivity and the feed value that is measured is conductivity.

6. The method of claim 1 further comprising limiting the amount of the water property concentration to be removed at a given flow rate based on a voltage limit of the flow-through capacitor.

7. The method of claim 1 wherein the flow rate is based on a system demand for water in a system attached to the flow-through capacitor.

8. The method of claim 7 wherein the system demand is measured by measuring at least one of a water pressure in the system and a tank water level.

9. The method of claim 7 wherein, when the system demand for water exceeds an ability of the flow-through capacitor to remove the amount of the water property concentration from the feed water stream at a particular demand flow rate, the amount of the water property concentration to be removed from the feed water stream is reduced.

10. The method of claim 1 further comprising the step of measuring the water property concentration for the treated water stream exiting the flow-through capacitor and altering control of at least one of the amperage and flow rate if a measured value of the water property concentration is different than the target value.

11. The method of claim 1 further comprising calculating a volume of the feed water stream that can be treated given a summed-current capacity of the flow-through capacitor and establishing a time duration of a treatment cycle based on the summed-current capacity and the flow rate.

12. The method of claim 1 wherein an end point of a treatment cycle is established when a maximum voltage of the flow-through capacitor is reached.

13. The method of claim 1 wherein the flow rate is varied over a time duration of the cycle to inhibit scaling.

14. The method of claim 1 wherein an end point of a treatment cycle is established when a maximum voltage of the flow-through capacitor is reached and the summed-current capacity of the system is adjusted based to be a monitored-current capacity at the maximum voltage.

15. The method of claim 1 wherein an end point of the treatment cycle is established when at least one of a pre-determined volume of the feed water stream has been treated and a duration of the cycle is reached.

16. The method of claim 1 wherein the flow rate has maximum and minimum flow rates.

17. A method of removing ions from a feed water stream using a flow-through capacitor having at least a pair of electrodes spaced from one another to accommodate a flow of water and configured to transfer ions between the pair of electrodes and the water, the method comprising:
 establishing a fixed percent removal of a water property concentration to be removed from the feed water stream passing through the flow-through capacitor;
 measuring a feed value for the water property concentration in a feed water stream entering the flow-through capacitor; and
 controlling an amperage of the flow-through capacitor and a flow rate through the flow-through capacitor to remove ions from the feed water stream to achieve the fixed percent removal of the water property concentration from the feed water stream;
 wherein an end point of a treatment cycle is established by a comparison of a monitored-current capacity of the flow-through capacitor over the duration of the treatment cycle to a summed-current capacity of the flow-through capacitor that is pre-established.

18. The method of claim 17 wherein the amperage is a function of an amount of ions to be removed from the feed water stream.

19. The method of claim 18 wherein the amount of ions correlates to the fixed percent removal of the water property concentration to be removed from the feed water stream.

20. The method of claim 18 wherein the amperage is further a function of the flow rate.

21. The method of claim 17 wherein the water property concentration correlates to conductivity and the feed value that is measured is conductivity.

22. The method of claim 17 further comprising limiting an amount of ions to be removed at a given flow rate based on a voltage limit of the flow-through capacitor.

23. The method of claim 17 wherein the flow rate is based on a system demand for water in a system attached to the flow-through capacitor.

24. The method of claim 23 wherein the system demand is measured by measuring at least one of a water pressure in the system and a tank water level.

25. The method of claim 23 wherein, when the system demand for water exceeds an ability of the flow-through capacitor to remove an amount of ions from the feed water stream at a particular demand flow rate, the amount ions to be removed from the feed water stream is reduced.

26. The method of claim 17 further comprising the step of measuring the water property concentration for the treated water stream exiting the flow-through capacitor and altering control of at least one of the amperage and flow rate if a measured removal percent value of the water property concentration is different than the fixed percent removal that is targeted.

27. The method of claim 17 further comprising calculating a volume of the feed water stream that can be treated given a summed-current capacity of the flow-through capacitor and establishing a time duration of a treatment cycle based on the summed-current capacity and the flow rate.

28. The method of claim 17 wherein an end point of a treatment cycle is established when a maximum voltage of the flow-through capacitor is reached.

29. The method of claim 17 wherein the flow rate is varied over a time duration of the cycle to inhibit scaling.

30. The method of claim 17 wherein an end point of a treatment cycle is established when a maximum voltage of the flow-through capacitor is reached and the summed-current capacity of the system is adjusted based to be a monitored-current capacity at the maximum voltage.

31. The method of claim 17 wherein an end point of the treatment cycle is established when at least one of a pre-determined volume of the feed water stream has been treated and a pre-determined duration of the cycle is reached.

32. The method of claim 17 wherein the flow rate has maximum and minimum flow rates.

* * * * *